(12) United States Patent  (10) Patent No.: US 9,046,690 B2
Sabry et al.  (45) Date of Patent: Jun. 2, 2015

(54) INTEGRATED MONOLITHIC OPTICAL BENCH CONTAINING 3-D CURVED OPTICAL ELEMENTS AND METHODS OF ITS FABRICATION

(71) Applicant: Si-Ware Systems, Cairo (EG)

(72) Inventors: Yasser M. Sabry, Cairo (EG); Tarik E. Bourouina, Joinville (FR); Bassam A. Saadany, Cairo (EG); Diaa A. M. Khalil, Cairo (EG)

(73) Assignee: Si-Ware Systems, Heliopolis, Cairo (EG)

( * ) Notice: Subject to any disclaimer, the term of this patent is extended or adjusted under 35 U.S.C. 154(b) by 183 days.

(21) Appl. No.: 13/655,694

(22) Filed: Oct. 19, 2012

(65) Prior Publication Data

US 2013/0100424 A1 Apr. 25, 2013

Related U.S. Application Data

(60) Provisional application No. 61/549,353, filed on Oct. 20, 2011.

(51) Int. Cl.
*G02B 6/26* (2006.01)
*G02B 26/08* (2006.01)
*G02B 6/32* (2006.01)
*G02B 6/35* (2006.01)

(52) U.S. Cl.
CPC .............. *G02B 26/0841* (2013.01); *G02B 6/32* (2013.01); *G02B 6/3516* (2013.01); *G02B 6/262* (2013.01)

(58) Field of Classification Search
CPC ........... G02B 26/0841; G02B 26/0833; G02B 6/3518

USPC .................... 257/419, 432; 359/210.1, 212.1; 385/16; 438/57, 700
See application file for complete search history.

(56) References Cited

U.S. PATENT DOCUMENTS

| | | | |
|---|---|---|---|
| 5,432,877 A | 7/1995 | Sun et al. | |
| 5,501,893 A | 3/1996 | Laermer et al. | |
| 6,051,503 A | 4/2000 | Bhardwaj et al. | |
| 6,187,515 B1 | 2/2001 | Tran et al. | |
| 7,687,301 B2 * | 3/2010 | Martini et al. | 438/57 |
| 8,411,340 B2 * | 4/2013 | Khalil et al. | 359/198.1 |
| 2002/0096686 A1 | 7/2002 | Raj et al. | |
| 2005/0111797 A1 * | 5/2005 | Sherrer et al. | 385/93 |
| 2005/0271326 A1 | 12/2005 | Luo | |

(Continued)

FOREIGN PATENT DOCUMENTS

| | | |
|---|---|---|
| JP | 2001141965 A | 5/2001 |
| JP | 2004125899 A | 4/2004 |
| WO | 0216997 A1 | 2/2002 |

OTHER PUBLICATIONS

Wu, et al., "Micromachined free-space integrated micro-optics," Sensors and Actuators A50 (1995) p. 127-134.

(Continued)

*Primary Examiner* — Minh-Loan Tran
(74) *Attorney, Agent, or Firm* — Loza & Loza, LLP; Holly L. Rudnick

(57) ABSTRACT

An optical system, such as an integrated monolithic optical bench, includes a three-dimensional curved optical element etched in a substrate such that the optical axis of the optical system lies within the substrate and is parallel to the plane of the substrate.

34 Claims, 24 Drawing Sheets

(56) References Cited

U.S. PATENT DOCUMENTS

| | | | |
|---|---|---|---|
| 2006/0245686 A1* | 11/2006 | Baumann et al. | ............... 385/18 |
| 2008/0213934 A1 | 9/2008 | Martini et al. | |
| 2009/0308839 A1 | 12/2009 | Martini et al. | |

OTHER PUBLICATIONS

Syms, et al., "Surface Tension Powered Self-Assembly of 3D Moems Devices Using DRIE of Bonded Silicon-On-Insulator Wafers," IEEE Seminar on Demonstrated Micromachining Techniques for Industry, Mar. 29, 2000 (7 pgs).

deBoer, et al., "Micromachining of Buried Micro Channels in Silicon," Jounral of Microelectromechanical Systems, vol. 9, No. 1, Mar. 2000, p. 94-103.

Lee, et al., "Vertical Mirror Fabrication Combining KOH Etch and DRIE of (110) Silicon," Journal of Microelectromechanical Systems, vol. 18, No. 1, Feb. 2009, p. 217-227.

Azimi, et al., "Realization of Three-Dimensional Micro and Nano-Structures on Silicon Substrates," Sharif University of Technology, Transaction F: Nanotechnology, vol. 17, No. 2, Dec. 2010, pp. 113-121.

Mallick, et al., "Multilayered Monolithic Silicon Photonic Crystals," IEEE Photonics Technology Letters, vol. 23, No. 11, Jun. 1, 2011, p. 730-732.

International Searching Authority; International Search Report and Written Opinion; International Application No. PCT/US12/61078; Feb. 7, 2013; 15 pgs.

Tran, et al.; Monolithic Integrated Optical Micro-Bench for High Density Photonics Packaging; IEEE Electronic Components & Technology Conference; May 25-28, 1998; pp. 588-591.

"MEMS Fabrication"; MEMSnet; 8 pgs retrieved from URL:http://web.archive.org/web/20110912024221/http://www/memsnet.org/mems/fabrication.html; downloaded Jan. 15, 2013.

* cited by examiner

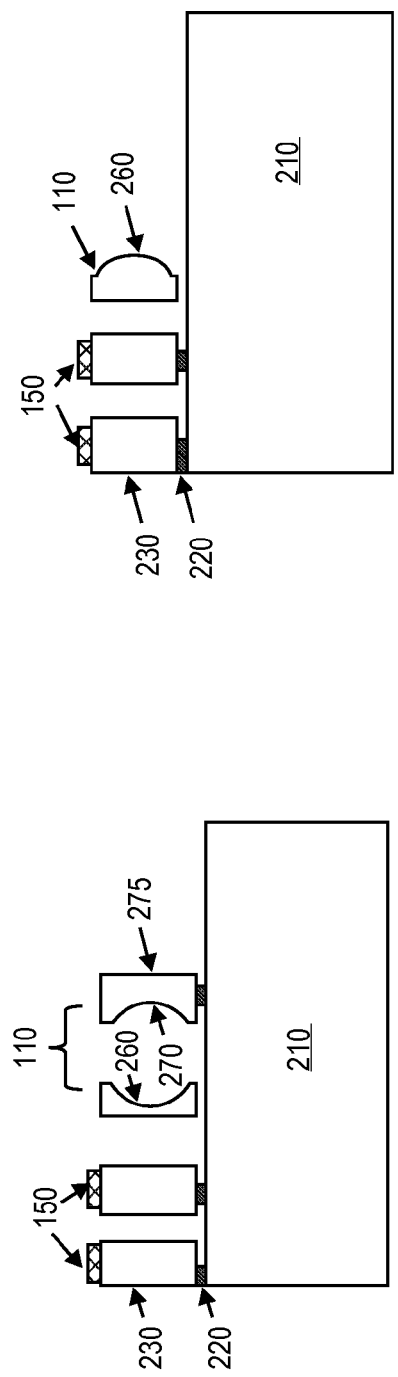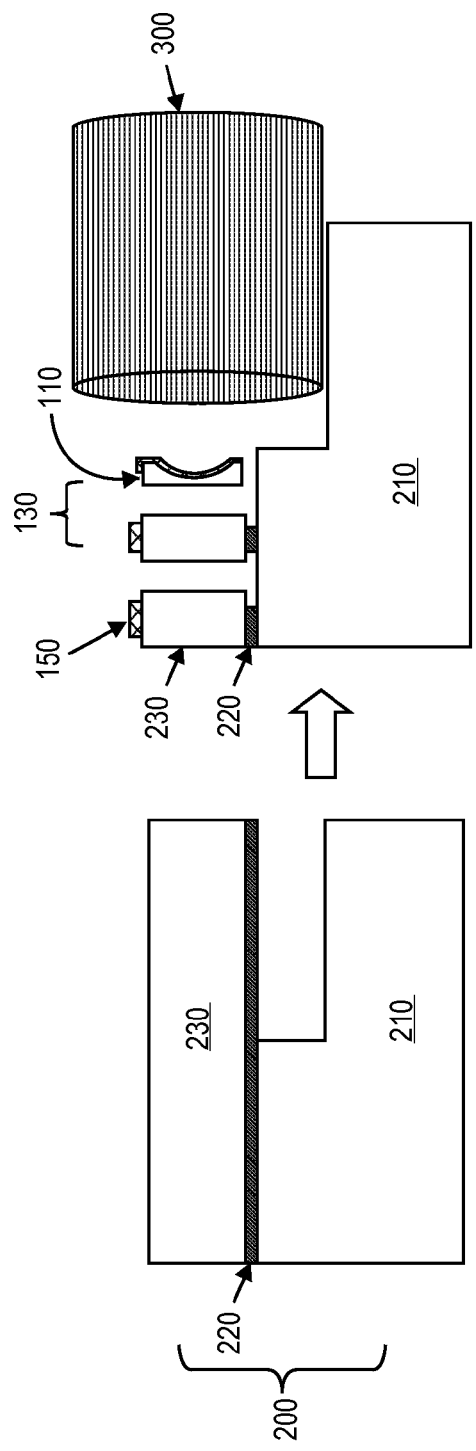

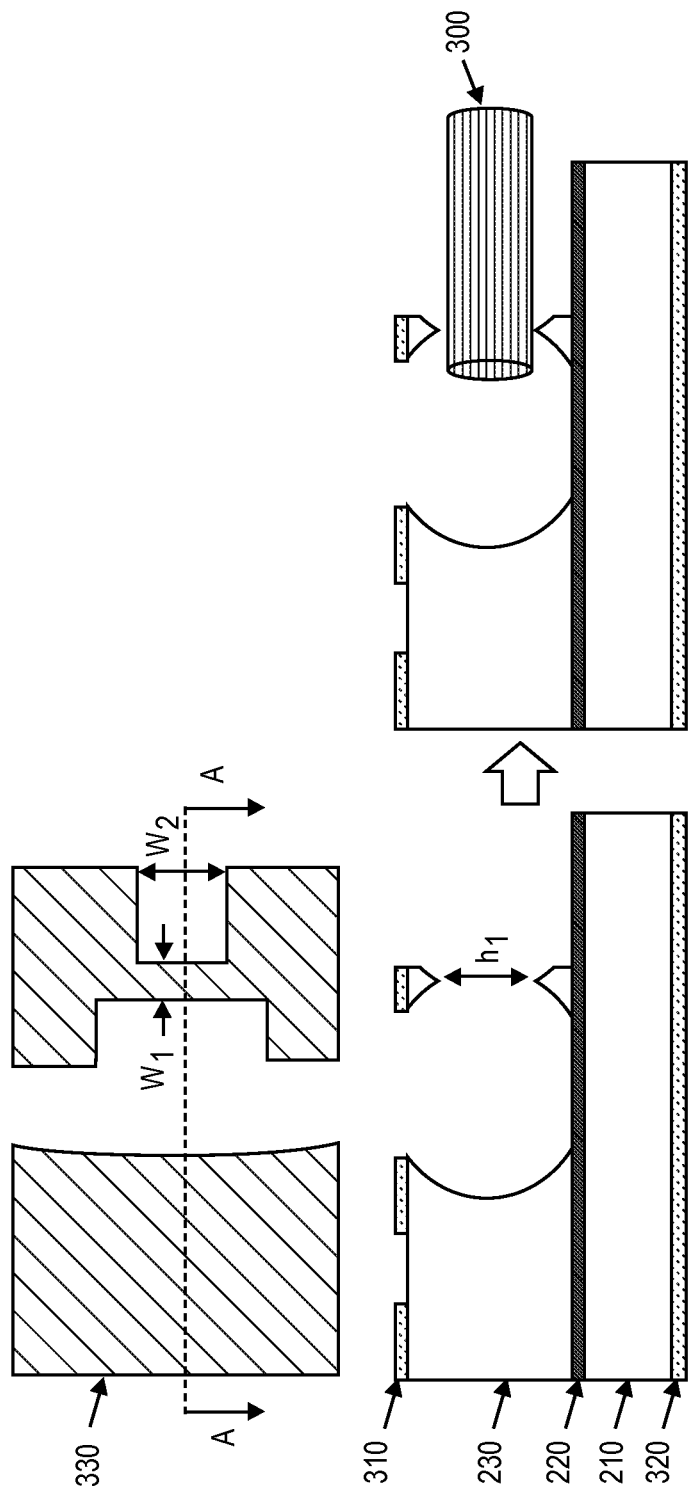

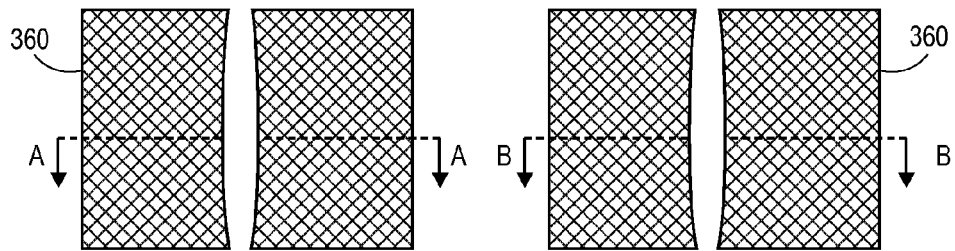
FIG. 23A  FIG. 24A
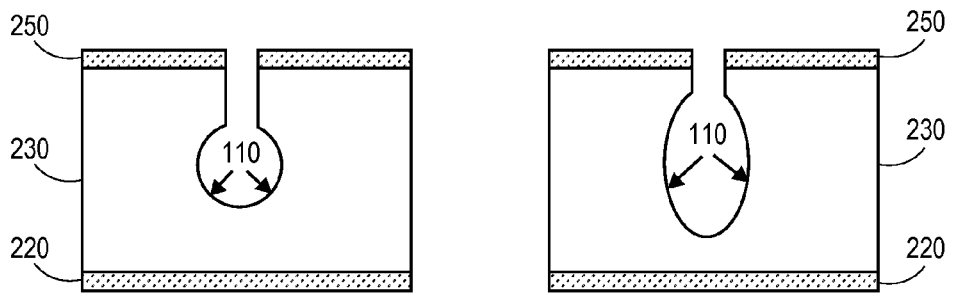
FIG. 23B  FIG. 24B
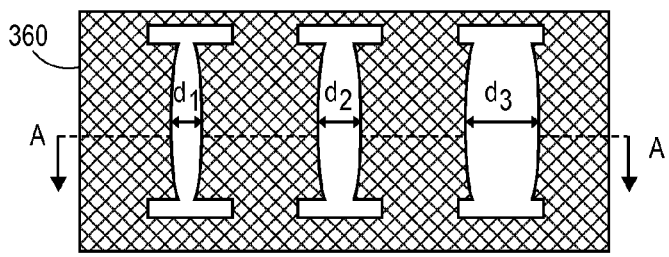
FIG. 25A
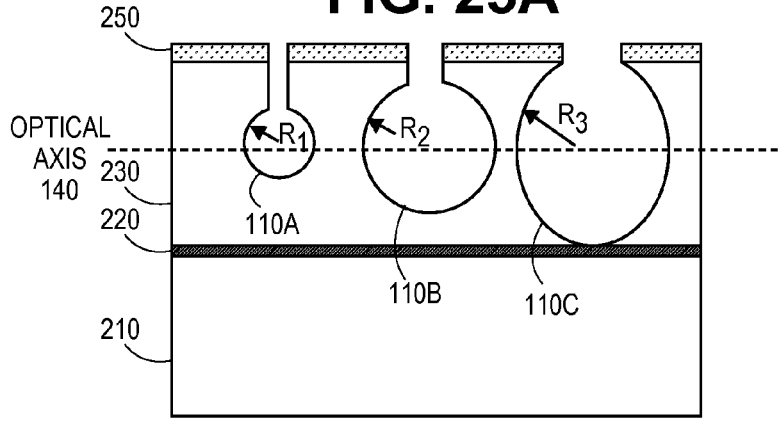
FIG. 25B

INTEGRATED MONOLITHIC OPTICAL BENCH CONTAINING 3-D CURVED OPTICAL ELEMENTS AND METHODS OF ITS FABRICATION

CROSS REFERENCE TO RELATED PATENTS

The present U.S. Utility patent application claims priority pursuant to 35 U.S.C. §119(e) to the following U.S. Provisional patent application which is hereby incorporated herein by reference in its entirety and made part of the present U.S. Utility patent application for all purposes:

1. U.S. Provisional Application Ser. No. 61/549,353, entitled "Integrated Monolithic Optical Bench Containing 3-D Curved Optical Elements and Methods of Its Fabrication,", filed Oct. 20, 2011.

BACKGROUND OF THE INVENTION

1. Technical Field of the Invention

The present invention relates in general to optical bench systems, and in particular to the production of monolithic optical bench systems micromachined on a substrate.

2. Description of Related Art

Micro Electro-Mechanical Systems (MEMS) refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. MEMS devices are attractive candidates for use in spectroscopy, profilometry, environmental sensing, refractive index measurements (or material recognition), as well as several other sensor applications, due to their low cost, batch processing ability and compatibility with standard microelectronics. In addition, the small size of MEMS devices facilitates the integration of such MEMS devices into mobile and hand held devices.

In optical applications, MEMS technology may be incorporated into an optical bench system to enable one or more optical elements to be moveably controlled by a MEMS actuator. Among these applications are interferometers, spectrometers, tunable optical cavities, fiber couplers, optical switches, variable optical beam shapers, optical micro scanners, variable optical attenuators, tunable lasers and many other applications in both sensor and telecommunications domains.

Conventional Silicon On Insulator (SOI) wafer optical benches produce optical elements that are flat in the direction perpendicular to the wafer surface. Although such optical elements are able to reflect, refract or diffract an impingent optical beam, the optical elements typically are not able to focus or collimate the optical beam. As a result, conventional optical bench systems suffer from weak coupling efficiency, high propagation loss and/or limited allowable optical beam travel distance inside the optical bench. These shortcomings limit the overall optical performance of such systems.

More recently, an optical bench system with collimation has been proposed using vertical flat mirrors attached to a tensional mechanical motion mechanism to produce an NxN optical MEMS switch, with the optical beam collimation function being implemented by the use of lensed optical fibers. However, such lensed optical fibers are costly and have a limited optical working distance.

Cylindrical mirrors (curved in the in-plane direction and flat in the out-of-plane direction) attached to linear MEMS actuators to focus the beam in the in-plane direction have also been proposed to produce variable optical attenuators and to increase the coupling efficiency of MEMS tunable lasers. To carry out the beam focusing in the out-of-plane direction, an HF thinned optical fiber functioning as a rod cylindrical lens was inserted. However, the addition of this fiber renders the optical system non-monolithic, in addition to the limited focusing ability due to the standard fiber circular cross section radius of curvature. Furthermore, the use of two different surfaces instead of a single surface leads to additional reflection loss and reduces the 3-D shaping capability.

Another 3-D focusing optical element has recently been introduced that uses refractive elements composed of two cylindrical surfaces tilted ±45° with respect to the substrate forming a rotation angle of 90° between them. The element may be etched using collimated X-ray beam lithography titled with angles −45° and 45° relative to the substrate to pattern the resist. However, the mirrors are cylindrical and require special lithography with special alignment, which again limits the performance in addition to being able to work in a refraction configuration only.

3-D micro optical bench systems that require further assembly steps after fabrication were also recently introduced. Rotational assembly was used to create micro optical subsystems that process free space beams travelling above the surface of a chip, where the optical elements after fabrication are rotated 90° and held from the side by latches. In these systems, the definition of the optical axis is governed by the accuracy and stability of the mechanical elements. Moreover, the optical axis lies above the substrate, preventing the monolithic integration of grooves for source insertion and rendering the integration of MEMS actuators, for moving the optical components in the in-plane or out-of-plane direction, a difficult task.

Hybrid integrated 3-D optical benches were also recently introduced. A micro device consisting of an in-plane polymer lens, a thick fiber holder and a mechanical shutter driven by an electrothermal actuator has been demonstrated by integration of polymer lens, poly-Si MUMPs and single-crystal-silicon HARM structures on a SOI wafer. Mechanical mounting systems for connecting and aligning optical components on an optical bench including focusing elements and other optical components were proposed as well. However, this hybrid integration is an obstacle for batch fabrication of monolithically integrated systems.

Attempts have been made to batch fabricate 3-D curved optical elements shapes on different surfaces, such as glass and silicon. However, most of the well-known methods produce the optical element lying on the surface, which does not enable the micro optical bench to manipulate in-plane optical beams. Reported 3-D concave structures typically work as photonic crystal mirrors reflecting out-of-plane optical beams, and can neither focus and collimate in-plane optical beams nor allow the insertion of the optical source on the wafer substrate.

Therefore, what is needed is a monolithic optical bench system containing a 3-D curved optical element capable of manipulating in-plane optical beams and that can be integrated with an optical source. In addition, what is needed is a monolithic optical bench system that includes both a 3-D curved optical element and one or more moveable optical elements that can be actuated by a MEMS actuator.

SUMMARY OF THE INVENTION

Embodiments of the present invention provide an optical system, such as a monolithic optical bench, that includes a substrate and a three-dimensional curved optical element etched in the substrate such that an optical axis of the optical system lies within the substrate and is parallel to the plane of the substrate. In one embodiment, a moveable optical element is further etched in the substrate and a Micro-Electro-Mechanical Systems (MEMS) actuator is coupled to the moveable optical element.

In an exemplary embodiment, the three-dimensional curved optical element is the moveable optical element. For example, the three-dimensional curved optical element can be coupled to the MEMS actuator and configured to move in-plane with respect to the substrate to tune a distance traveled by an optical beam propagating parallel to the plane of the substrate or out-of-plane with respect to the substrate to tune a position of the optical axis.

In another exemplary embodiment, the optical system further includes a flat element formed on the substrate, in which the flat element has a flat surface perpendicular to the optical axis. In this embodiment, the flat element and/or the three-dimensional curved optical element may be the moveable optical element. In addition, the three-dimensional curved optical element can be fabricated using a first etching mask and the flat element can be fabricated using a second etching mask, in which the three-dimensional curved optical element can be protected in a shadow region under the second etching mask during fabrication of the flat element.

In a further embodiment, the substrate includes a handle layer, a device layer and an etch stop layer between the handle layer and the device layer. In an exemplary embodiment, the three-dimensional curved optical element is fabricated using multiple time-controlled etching steps in one of the device layer and the handle layer, in which the multiple time-controlled etching steps include at least one anisotropic etching step, at least one surface-protection step and at least one isotropic etching step, in which the etching depths of the etching steps are related to a target surface profile of the three-dimensional curved optical element. In this embodiment, a radius of curvature of the three-dimensional curved optical element can be based on the size of the mask opening and the etching parameters.

In another exemplary embodiment, a concave surface of the three-dimensional curved optical element is fabricated by continuously changing etching parameters during an anisotropic etching step that etches through a small mask opening in one of the device layer and the handle layer. In this embodiment, a radius of curvature of the three-dimensional curved optical element is based on the size of the mask opening and the etching parameters.

Embodiments of the present invention further provide a method for fabricating an optical system on a substrate. In the method, a three-dimensional curved optical element is etched in the substrate such that an optical axis of the optical system lies within the substrate and is parallel to the plane of the substrate.

BRIEF DESCRIPTION OF THE DRAWINGS

A more complete understanding of the present invention may be obtained by reference to the following detailed description when taken in conjunction with the accompanying drawings wherein:

FIGS. 3A and 3B illustrate exemplary curved surfaces of the three-dimensional optical element, in accordance with embodiments of the present invention;

FIG. 4 illustrates an exemplary monolithic optical bench facilitating insertion of an optical fiber source, in accordance with embodiments of the present invention;

FIGS. 8A and 8B illustrate another exemplary integrated optical bench including a three-dimensional curved optical element and a fiber groove for receiving an optical fiber source, in accordance with the present invention;

FIGS. 23A and 23B illustrate exemplary lithography and isotropic etching steps for fabricating a three-dimensional curved optical element, in accordance with embodiments of the present invention;

FIGS. 24A and 24B illustrate other exemplary lithography and isotropic etching steps for fabricating a three-dimensional curved optical element, in accordance with embodiments of the present invention;

FIGS. 25A and 25B illustrate various lithography and etching steps for fabricating various three-dimensional curved optical elements, in accordance with embodiments of the present invention;

DETAILED DESCRIPTION OF THE DRAWINGS

In accordance with embodiments of the present invention, an optical system, such as an integrated monolithic optical bench system, including one or more three-dimensional (3-D) curved optical elements can be micromachined on a substrate or SOI wafer (hereinafter collectively referred to as a "substrate"). The optical system may further include one or more flat elements and one or more Micro-Electro-Mechanical Systems (MEMS) actuators. The three-dimensional curved optical elements may be singly-curved optical elements or doubly-curved optical elements in both in-plane and out-of-plane directions in either a reflection or refraction configuration. Furthermore, embodiments of the present invention provide a technique for fabrication of three-dimensional curved optical elements with controlled curvature in both the substrate plane and the plane perpendicular to the substrate. As a result, the optical system is able to manipulate in-plane optical beams propagating parallel to the substrate with 3-D focusing, collimation and beam transformation capabilities. In addition, the feature size of the optical system can range from a few to hundreds of microns, which makes it compatible with optical fibers, LEDs and semiconductor lasers. Such an optical system introduces a significant performance boost in a number of applications where free space propagation losses and coupling losses are significant. Among these applications are interferometers, spectrometers, tunable optical cavities, fiber couplers, optical switches, variable optical beam shapers, optical micro scanners, variable optical attenuators, tunable lasers and many other applications in both sensor and telecommunications domains.

Figure 1:
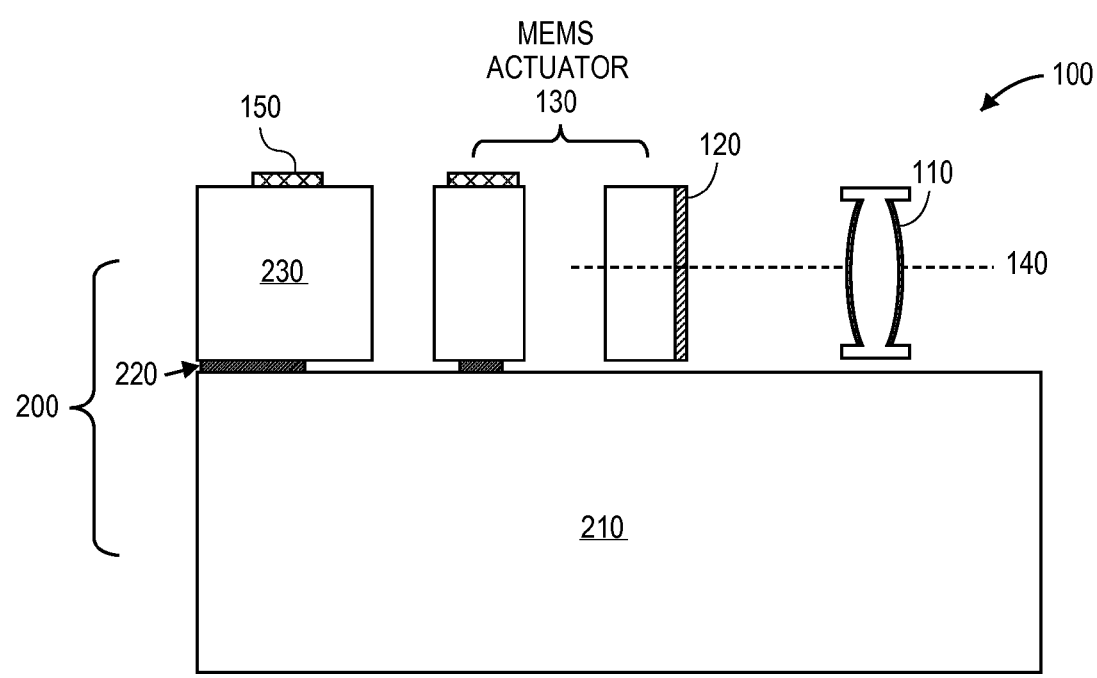
FIG. 1 illustrates an exemplary integrated monolithic optical bench including a three-dimensional curved optical element, in accordance with embodiments of the present invention.

Referring now to FIG. 1, there is illustrated an exemplary monolithic optical bench system 100, in accordance with embodiments of the present invention. The monolithic optical bench system 100 includes a three-dimensional curved optical element 110, a moveable optical element 120 and a MEMS actuator 130. The MEMS actuator 130 may be, for example, an electrostatic actuator, such as a comb drive actuator, parallel plate actuator or other type of actuator. The moveable optical element 120 is coupled to the MEMS actuator 130, such that motion of the MEMS actuator causes a displacement in the position of the moveable optical element 120. One or more pads 150 may be fabricated on the surface of the monolithic optical bench system 100 to provide for electrical connection of the monolithic optical bench system 100 to other components.

The optical bench system 100 is shown in FIG. 1 fabricated on a substrate 200, such as silicon (Si) or another type of substrate (e.g., plastic, glass, etc.). The substrate 200 includes a handle layer 210, an etch stop or sacrificial (e.g., buried oxide (BOX)) layer 220 and a device layer 230. In an exemplary embodiment, the handle layer 210 is several times thicker than the device layer 230. As shown in FIG. 1, the three-dimensional curved optical element 110, moveable optical element 120 and MEMS actuator 130 are formed within the device layer 230. However, in other embodiments, one or more of the three-dimensional curved optical element 110, moveable optical element 120 and MEMS actuator 130 may be formed within the handle layer 210 or within a combination of the device layer 230 and the handle layer 210. In either embodiment, the optical elements 110 and 120 of the monolithic optical bench 100 are fabricated such that an optical axis 140 of the monolithic optical bench 100 is parallel to the plane of the substrate 200 and lies within the substrate 200.

Thus, as used herein, the term "three-dimensional curved optical element" refers to an optical element having at least one surface perpendicular to the plane of the substrate 200 that is curved in a reflection or refraction configuration with a concave or convex shape, such that the three-dimensional curved optical element can manipulate in-plane optical beams propagating parallel to the plane of the substrate (e.g., along the optical axis 140) to provide one or more of 3-D focusing, collimation and optical beam transformation. For example, the three-dimensional curved optical element 110 may be a spherical mirror or a spherical or elliptical lens that controls light diffraction in both x and y directions perpendicular to the propagation direction of the optical beam.

The moveable optical element 120 is shown as a flat element, such that the surface perpendicular to the plane of the substrate 200 is flat. However, in other embodiments, the moveable optical element 120 may be a three-dimensional curved optical element. Moreover, other flat elements may further be included within the optical bench system 100. Such flat elements may be optical, mechanical and/or electrical elements. One example of a flat element is MEMS actuator 130. Other examples of flat elements include optical flat surfaces working in reflection or refraction modes.

The curved surfaces are created by combining the in-plane curvature produced from a drawn mask layout and lithography together with multi-step etching techniques to produce the required profile in the out-of-plane direction (e.g., the direction perpendicular to the plane of the substrate 200). In one embodiment, as will be described in more detail below in connection with FIG. 13, the multi-step etching is programmed in a pre-calculated manner according to the desired concave or convex shape and desired curvature. By etching the three-dimensional curved optical element 110 in the substrate 200, the optical axis 140 of the monolithic optical bench 100 lies within the substrate 200 and is defined by the lithography and etching steps.

Figure 2A:
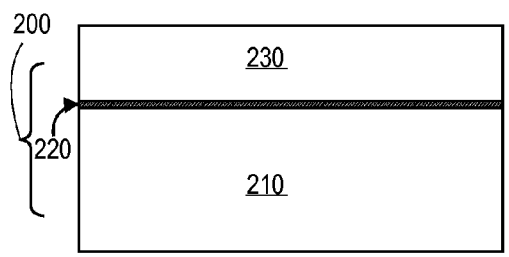
FIGS. 2A-2M illustrate exemplary process steps for fabricating a monolithic optical bench including a three-dimensional curved optical element, in accordance with embodiments of the present invention.
Figure 2F:
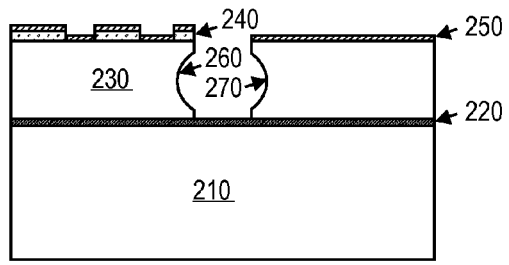
Figure 2B:
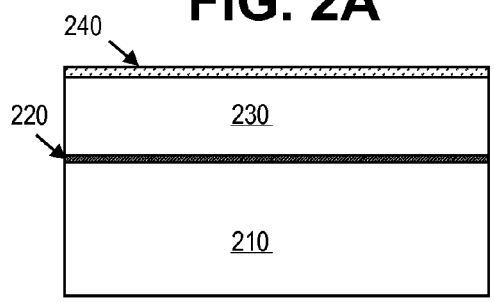

Exemplary process steps for fabricating a monolithic optical bench system are shown in FIGS. 2A-2M. The process starts in FIG. 2A with a substrate 200 including a handle layer 210, a BOX layer (etch stop layer) 220 and a device layer 230. In FIGS. 2B-2C, a first etching mask 240 is deposited and patterned, while in FIGS. 2D-2E, a second etching mask is deposited and patterned. The first etching mask 240 includes openings for both flat and curved surface etching locations, while the second etching mask 250 includes openings for curved surface locations only. A concave curved surface 260 of the three-dimensional curved optical element is etched in FIG. 2F, which produces an opposing concave curved surface 270 of a dummy layer 275.

Figure 2G:
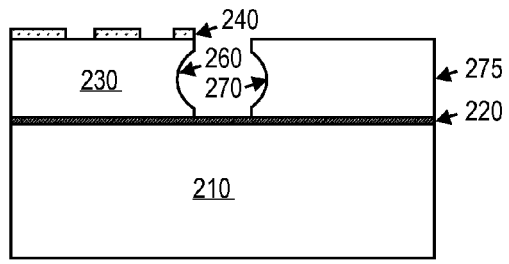
Figure 2C:
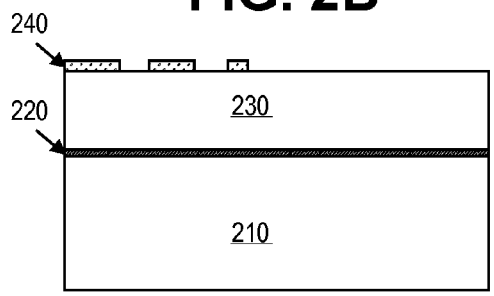
Figure 2H:
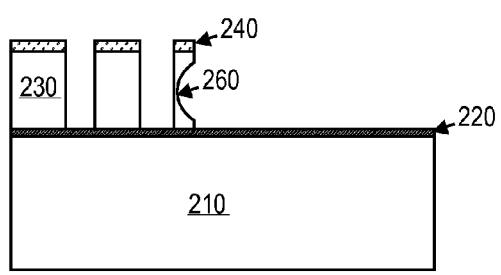
Figure 2D:
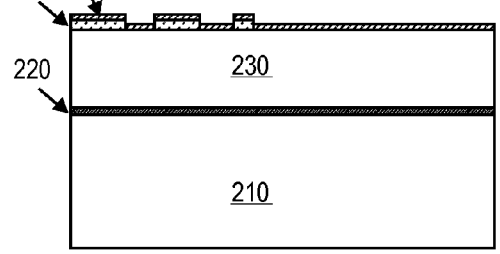
Figure 2I:
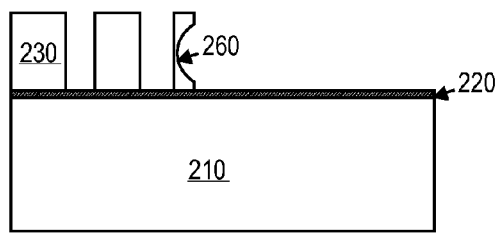
Figure 2E:
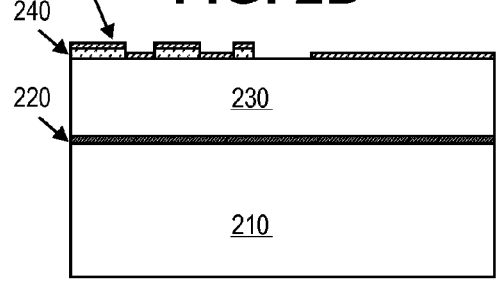
Figure 2J:
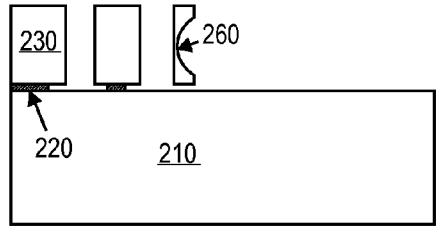

The optical surface is optionally smoothed and the second etching mask is removed in FIG. 2G. It should be noted that the first and second etching masks 240 and 250 should be chosen to be compatible with the nature of the smoothing step. It should further be noted that protecting the curved surface 260 from further etch by a coating layer is optional, since the curved surface 260 lies in the shadow region under the first etching mask 240 and the following etching step is anisotropic, which will not affect the curved surface 260. Flat surface etching is carried out in FIG. 2H by, for example, Deep Reactive Ion Etching (DRIE), using the first etching mask 240. The flat surfaces include, for example, the MEMS actuator 130 and/or optical flat surfaces. The first etching mask 240 is removed in FIG. 2I, and the moving structures are released by selectively removing the etch stop layer 220 in FIG. 2J.

Figure 2K:
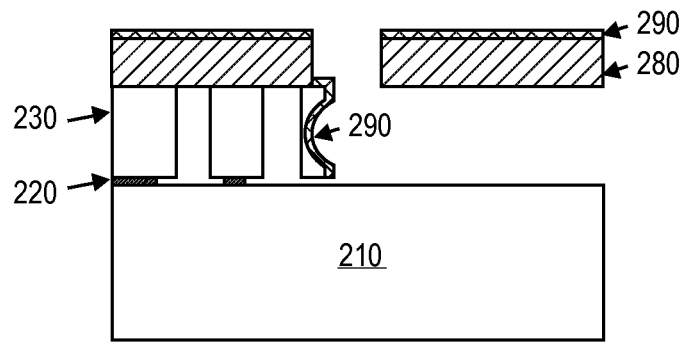
Figure 2L:
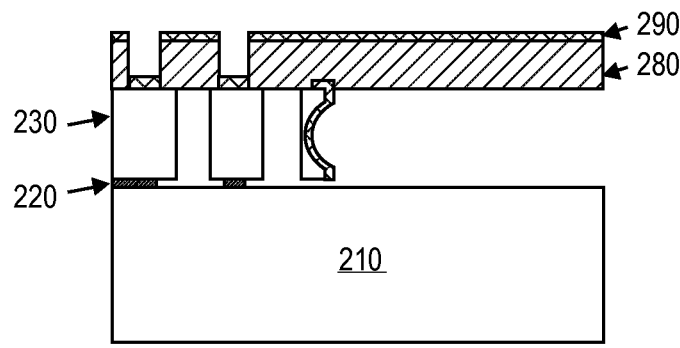
Figure 2M:
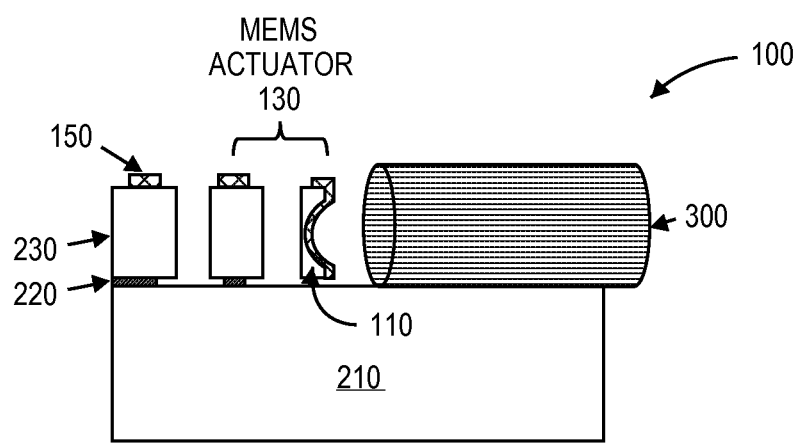

As shown in FIG. 2K, a metal layer 290 can be deposited on the curved surface 260 using sputtering or any other metallization technique through a shadow mask 280. The pads 150 for electrical connection can be metallized in the same step with the curved surface 260, or in a separate step, as in FIG. 2L. Finally, an optical fiber 300 or other optical source (i.e., an LED or semi-conductor laser) is inserted in FIG. 2M to complete the optical bench system 100 including the three-dimensional curved optical element 110. As shown in FIG. 2M, the three-dimensional curved optical element 110 includes a single concave-shaped curved surface and is moveable using MEMS actuator 130.

Many variants exist for the curved surface. For example, as shown in FIG. 3A, only part of the dummy wall 275 may be removed, thus leaving two optical (concave) surfaces 260 and 270 forming a three-dimensional optical cavity 110. In another example, as shown in FIG. 3B, the curved surface 260 of the three-dimensional curved optical element 110 may have a convex shape, depending on the fabrication process steps employed. Other configurations of the monolithic optical bench 100 may be created by combining any number of curved and flat surfaces.

In one embodiment, reduced-cladding-diameter fiber may be used to match the fiber optical axis with the curved elements optical axis. However, the insertion of optical fiber may be problematic when using large diameter fibers due to an insufficient depth in the device layer 230 for aligning the fiber optical axis with the three-dimensional curved optical elements central axis. Therefore, part of the handle layer 210 of the substrate 200 can be etched before or after the formation of the three-dimensional optical element 110.

Figure 5A:
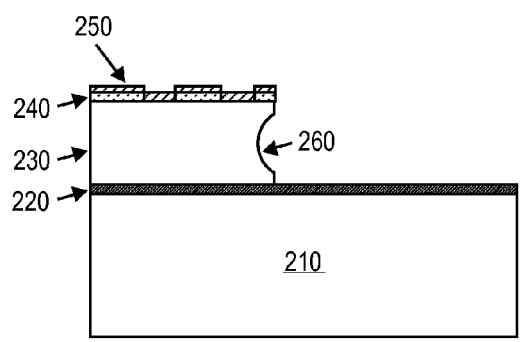
FIGS. 5A-5D illustrate exemplary process steps for fabricating a monolithic optical bench facilitating insertion of an optical fiber source, in accordance with embodiments of the present invention.
Figure 5B:
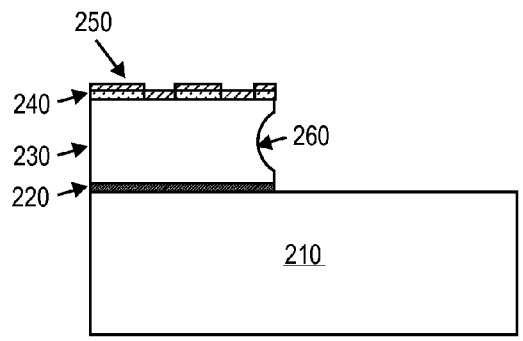
Figure 5C:
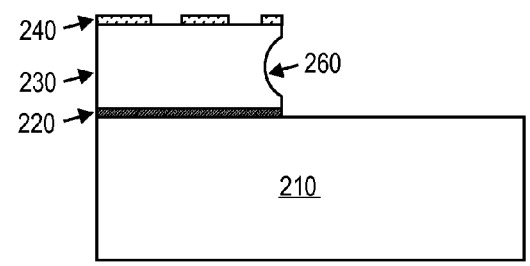
Figure 5D:
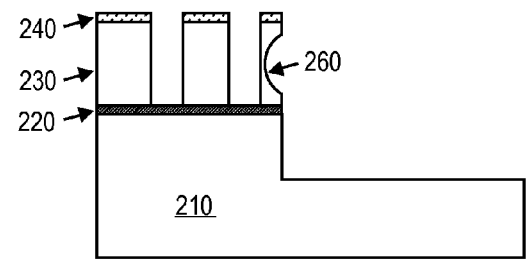

In an exemplary embodiment, as shown in FIG. 4, the handle layer 210 can be first etched in specific locations before wafer bonding. Then, the fabrication process is completed, as shown in FIGS. 2A-2M. In another exemplary embodiment, as shown in FIGS. 5A-5D, the handle layer 210 of the substrate 200 can be etched during etching of the flat surfaces. For example, as shown in FIG. 5A, the dummy surface in the fiber insertion locations is etched while forming the curved surface 260. In FIG. 5B, the etch stop layer is anisotropically etched, and in FIG. 5C, the second etching mask 250 is removed. The flat surfaces are anisotropically etched in FIG. 5D, and at the same time, the handle layer 210 is etched for fiber insertion. It should be noted that etching can continue after the flat surfaces depth reaches the etch stop layer 220 until the desired depth is reached in the handle layer 210 for fiber insertion.

Figure 6A:
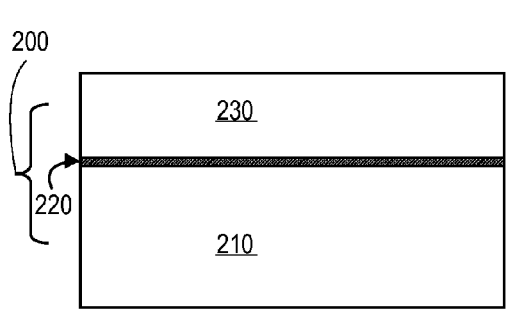
FIGS. 6A-6L illustrate other exemplary process steps for fabricating a monolithic optical bench including a three-dimensional curved optical element, in accordance with embodiments of the present invention.
Figure 6E:
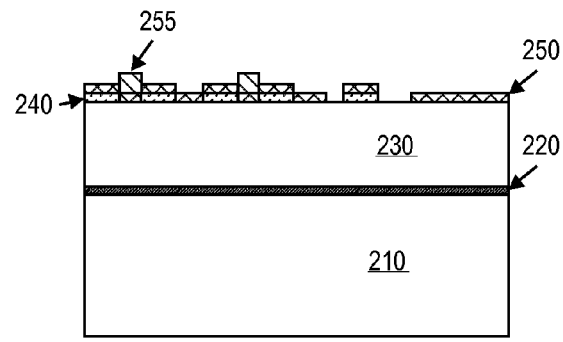
Figure 6B:
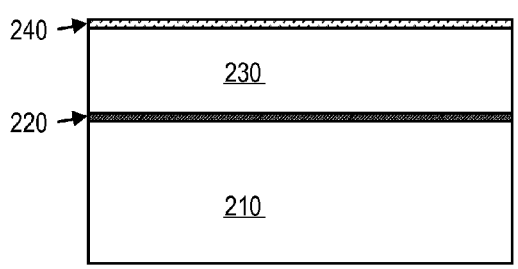

The curved optical surface 260 can be coated with multiple layers of dielectric material to function as a Bragg reflector or with an anti-reflection coating to function as a lens. FIGS. 6A-6L depict another process flow in which the curved optical surfaces may be coated and the flat optical surfaces, if present, may be metallized. In embodiments in which optical surface smoothing is performed by isotropic etching, the second etching mask 250 can be, for example, aluminum (Al) and can be simultaneously used for pad 150 metallization. Thus, as shown in FIGS. 6A and 6B, the first etching mask 240 is deposited or grown on the device layer 230 of the substrate 200. In FIG. 6C, the first etching mask 240 is patterned, and in FIG. 6D, the metal (i.e., Al) is deposited as the second etching mask 250. The second etching mask 250 is patterned in FIG. 6E and the pad locations are protected by photoresist or any other protecting material 255.

Figure 6F:
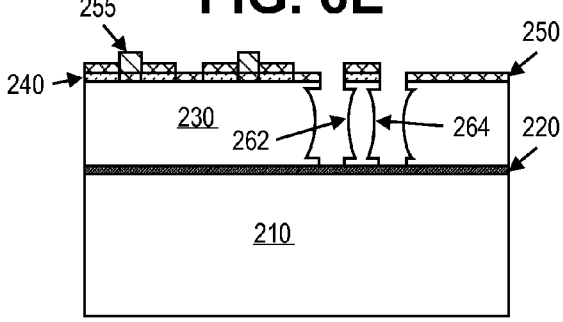
Figure 6C:
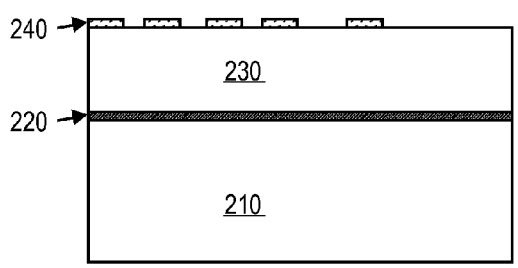
Figure 6G:
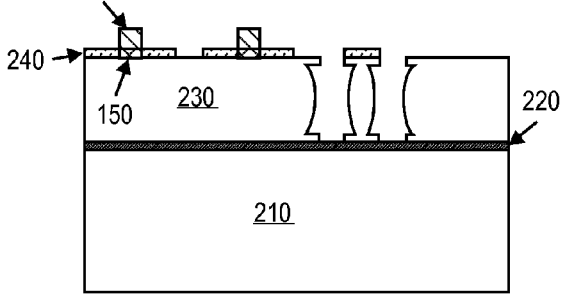
Figure 6D:
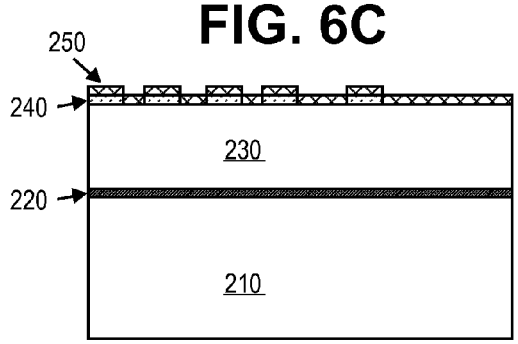
Figure 6H:
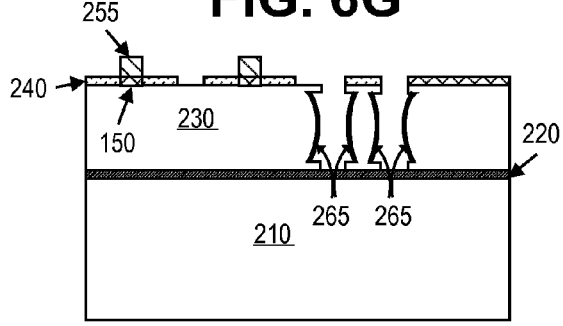

In FIG. 6F, the curved optical surfaces 262 and 264 are etched in the device layer 230 through the second etching mask 250. In FIG. 6G, the curved optical surfaces 262 and 264 are smoothed and the second etching mask 250 is removed, and in FIG. 6H, the curved optical surfaces 262 and 264 are coated with a coating material 265. For example, the coating material 265 may be a single-layer anti-reflective coating material or a multi-layer dielectric material. In one embodiment, the smoothing is performed by dry or wet chemical etching using, for example, HNA (which is a mixture of Hydrofluoric acid, Nitric acid and Acetic acid), since the pad locations are protected. In another embodiment, the second etching mask 250 is removed after smoothing and the curved optical surface is multi-layer coated. Since the coating 265 is conformal and deposits everywhere, an anisotropic etch may also be performed in FIG. 6H to remove the coating 265 from other surfaces. During the coating removal etch, the coating 265 of the curved surfaces 262 and 264 may be protected, for example, under the shadow region of the first etching mask 240.

Figure 6I:
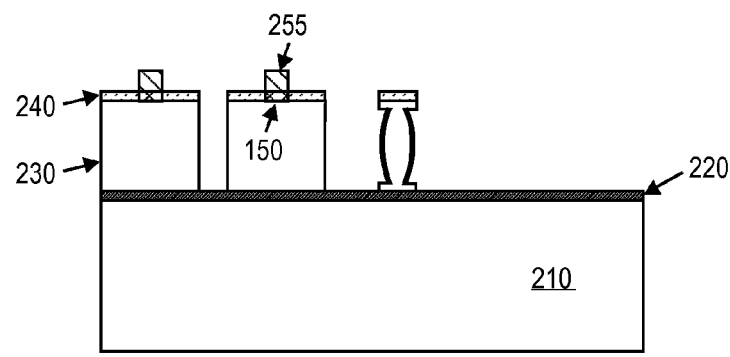
Figure 6J:
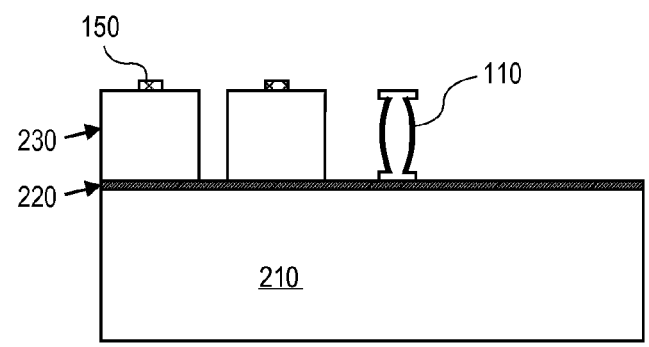
Figure 6K:
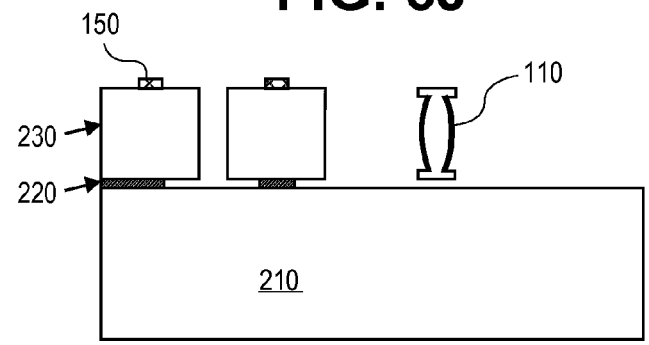
Figure 6L:
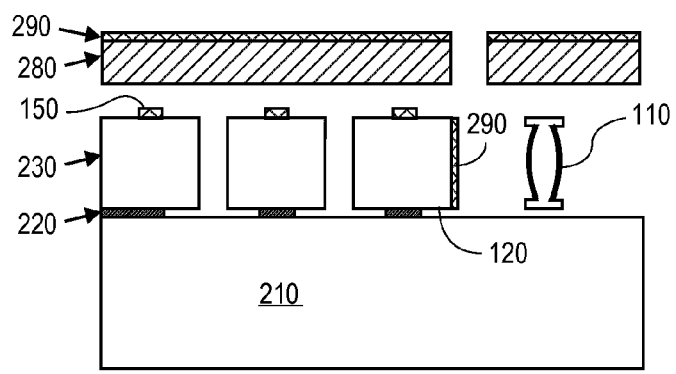

Flat surface etching is carried out by, for example, DRIE, using the first etching mask 240 in FIG. 6I. In FIG. 6J, the first etching mask 240 is removed, and in FIG. 6K, the moveable parts are released by selectively removing the etch stop layer 220 under the device layer 230. In embodiments in which one or more flat surfaces are mirrors 120, metallization 290 of the flat mirror surfaces can be performed though a shadow mask 280, as shown in FIG. 6K.

Figure 7A:
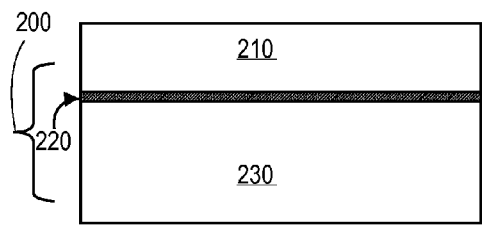
FIGS. 7A-7P illustrate further exemplary process steps for fabricating a monolithic optical bench including a three-dimensional curved optical element, in accordance with embodiments of the present invention.
Figure 7E:
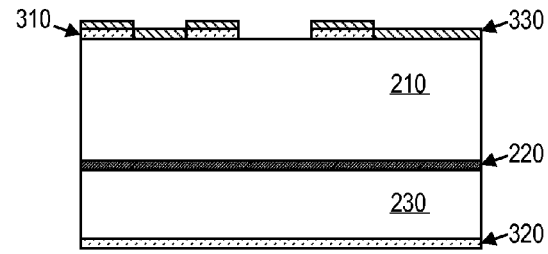
Figure 7B:
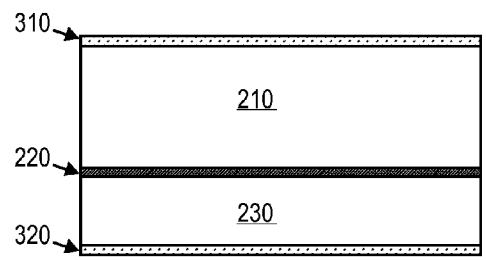
Figure 7F:
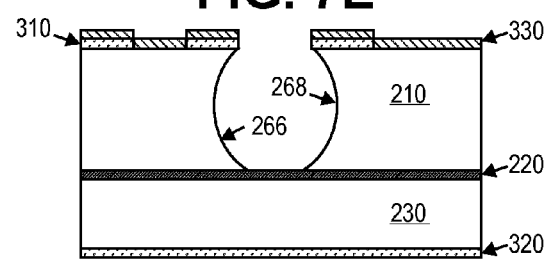
Figure 7C:
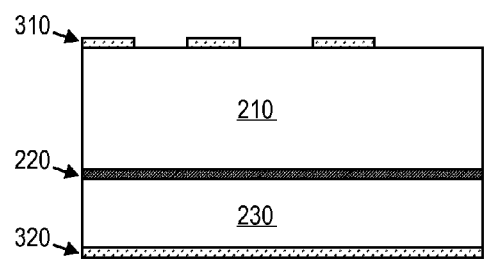
Figure 7G:
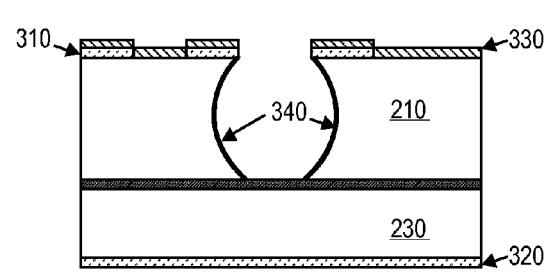
Figure 7D:
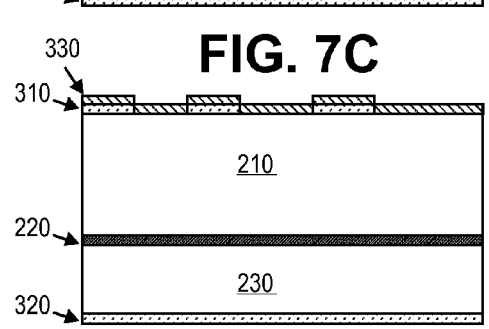
Figure 7H:
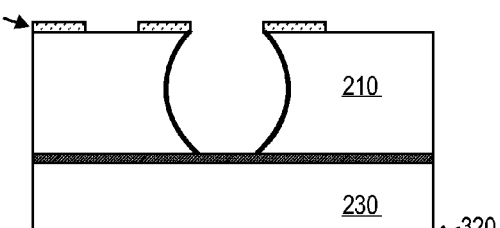
Figure 7I:
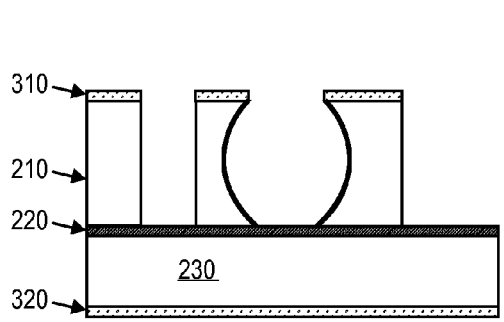
Figure 7M:
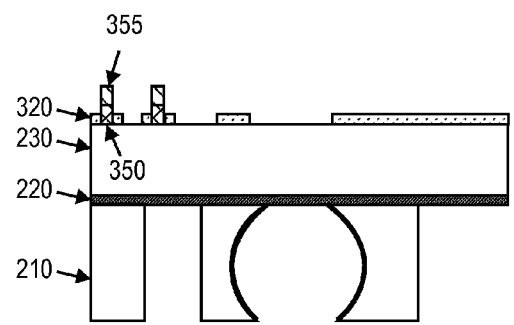
Figure 7J:
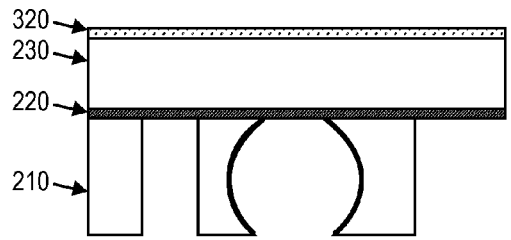
Figure 7N:
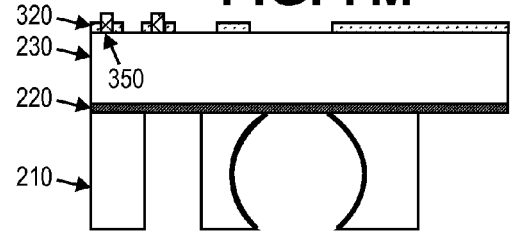
Figure 7K:
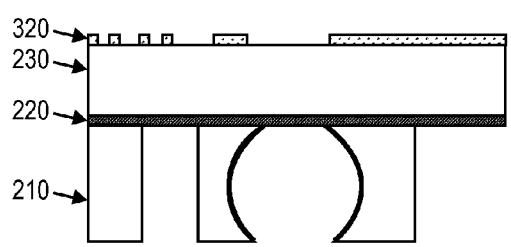
Figure 7O:
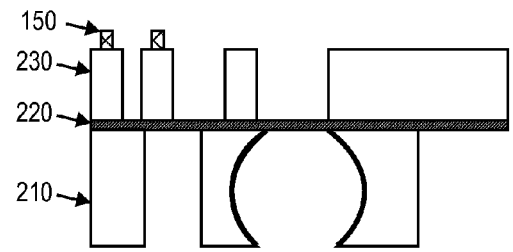
Figure 7L:
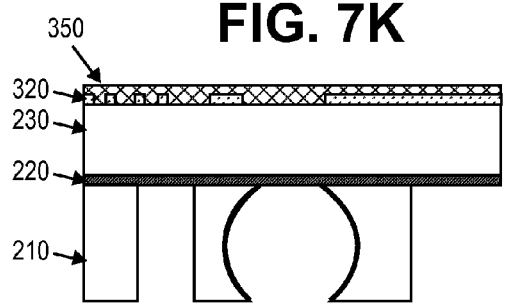
Figure 7P:
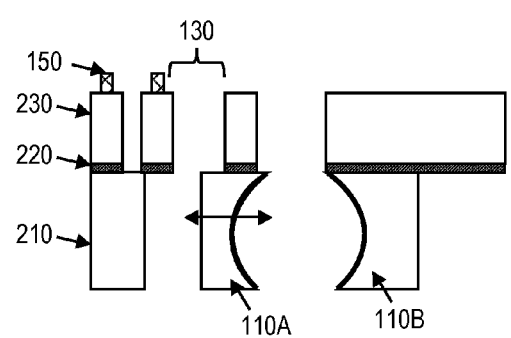

FIGS. 7A-7P illustrate another method for monolithic fabrication of three-dimensional curved optical elements together with flat elements for MEMS actuation, in which the optical elements are etched on the handle layer 210 of the substrate 200 and the electrical and mechanical elements are formed on the device layer 230 of the substrate. For example, as shown in FIGS. 7A and 7B, a first etching mask 310 is deposited on the handle layer 210 of the substrate 200 and a second etching mask 320 is deposited on the device layer 230 of the substrate 200. In FIG. 7C, the first etching mask 310 is patterned on the handle layer 210 of the substrate 200, while in FIGS. 7D-7E, a third etching mask 330 is deposited and patterned on the handle layer 210 of the substrate 200. The first etching mask 310 includes openings for both flat and curved surface etching locations, while the third etching mask 330 includes openings for curved surface locations only. The curved surfaces 266 and 268 of the three-dimensional curved optical element are etched in FIG. 7F.

The curved optical surfaces 266 and 268 are coated with a coating material 340 in FIG. 7G. For example, the curved optical surfaces 266 and 269 can be multi-layer coated with a dielectric material, anti-reflective coated or metallized by sputtering through a shadow mask. The third etching mask 330 is removed in FIG. 7H and flat surface etching is performed in FIG. 7I to form any other flat elements of the optical bench system, along with fiber grooves, and to prepare for the release of any moving parts. In one embodiment, the moving parts are composed of parts from the handle layer 210 attached to the MEMS actuators in the device layer 230.

The device layer 230 is prepared for etching in FIG. 7J, and the second etching mask 320 for the device layer 230 is patterned in FIG. 7K. In FIG. 7L, a metal layer 350 is deposited to create metallic pads 150 and the pad locations are protected by photoresist or any other protecting material 355 prior to removing the metal layer 350 in FIG. 7M. The protecting material 355 over the metallic pads 150 is removed in FIG. 7N. DRIE of the flat electrical and mechanical elements and removal of the second etching mask 320 is performed in FIG. 7O.

In FIG. 7P, any moving parts are released by selectively removing the etch stop layer 220. For example, MEMS actuator 130 can be released in the device layer 230 to control movement of three-dimensional curved optical element 110A in the handle layer 210. Such movement may be in-plane, as shown in FIG. 7P, or out-of-plane. In addition, other optical elements in the handle layer 210, such as three-dimensional curved optical element 110B, may be fixed, as shown in FIG. 7P, or moveable in the in-plane or out-of-plane direction. Out-of-plane movement of one or more optical elements may be necessary due to slight process variations present within a single die that can create a slight misalignment in the respective optical axes of optical elements in the vertical (out-of-plane) direction. The alignment can be fine-tuned after fabrication by attaching the optical elements to respective vertical actuation mechanisms. The actuation can be done by a vertical MEMS comb-drive fabricated for this purpose, utilizing, for example, BOX layer 220 gap of the substrate 200 or any other method.

It should be understood that many variants of the processing steps exist to achieve a monolithic optical bench in which three-dimensional curved and/or flat optical elements coexist with curved and/or flat surfaces working as MEMS (electrical and mechanical) components for sensing and actuation.

As shown in FIGS. 8A and 8B, to facilitate the alignment of an optical fiber axis with the three-dimensional curved optical element axis, a three-dimensional fiber groove can be etched substantially simultaneous to forming the curved surface. As can be seen in FIG. 8A, widths $w_1$ and $w_2$ of the curved surface etching mask 330 can be chosen such that the etching time produces the required fiber groove height $h_1$ that allows easy and accurate alignment of the fiber 300. The three-dimensional groove can be formed completely while etching the curved surface, as shown in FIGS. 8A and 8B, or partially and then completed during the flat surface etching.

Figure 9A:
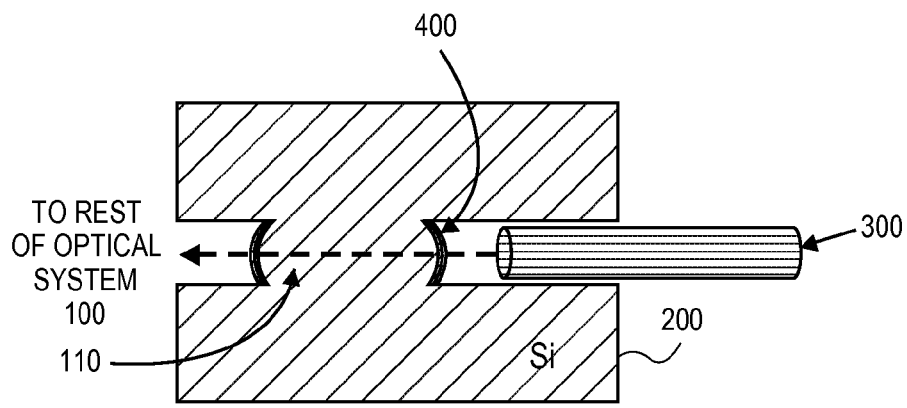
FIGS. 9A and 9B illustrate another exemplary monolithic optical bench including a three-dimensional curved optical element for use with a cleaved fiber, in accordance with embodiments of the present invention.
Figure 9B:
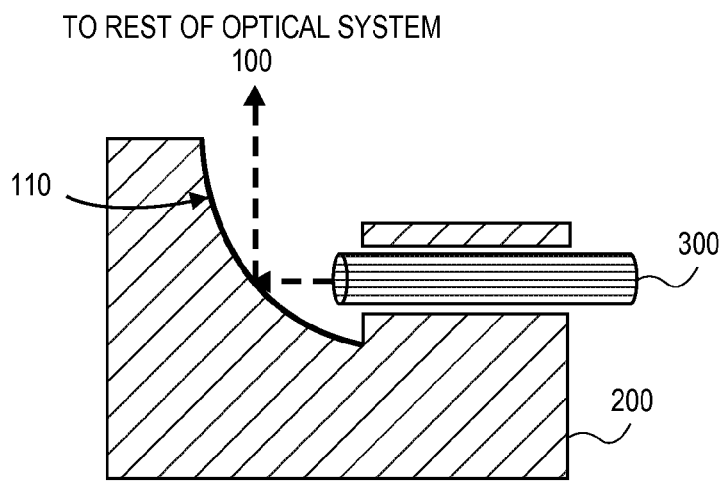

FIGS. 9A and 9B illustrate an exemplary monolithic optical bench including a three-dimensional curved optical element 110 and a cleaved optical fiber 300, which collectively form a lensed fiber. The three-dimensional curved optical element 110 can work in a refractive configuration, as shown in FIG. 9A, or a reflective configuration, as shown in FIG. 9B. In addition, various coating materials 400 can be used to minimize the insertion loss of the lensed fiber. The lensed fiber can be a standalone optical bench system or part of a larger optical bench system.

Figure 10:
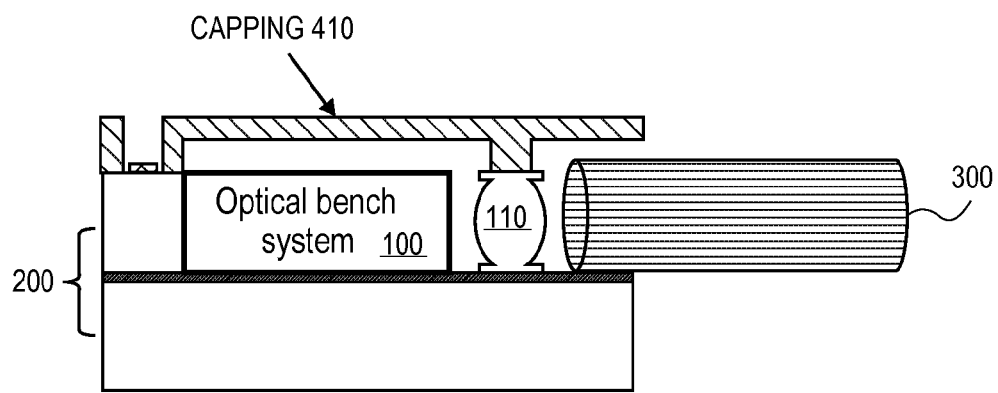
FIG. 10 illustrates an exemplary sealed monolithic optical bench using a three-dimensional refractive optical element, in accordance with embodiments of the present invention.

As shown in FIG. 10, in embodiments in which the three-dimensional curved optical element 110 has a refractive configuration, the optical bench system 100 (which includes the three-dimensional curved optical element 110) may be capped by a capping material 410, thus isolating the fiber groove receiving the optical fiber 300 from the optical bench system 100 and the optical bench system 100 from the outside environment. The capping material 410 may be, for example, a metallic or dielectric material or any other material that can be used to seal the optical bench system 100.

Figure 11:
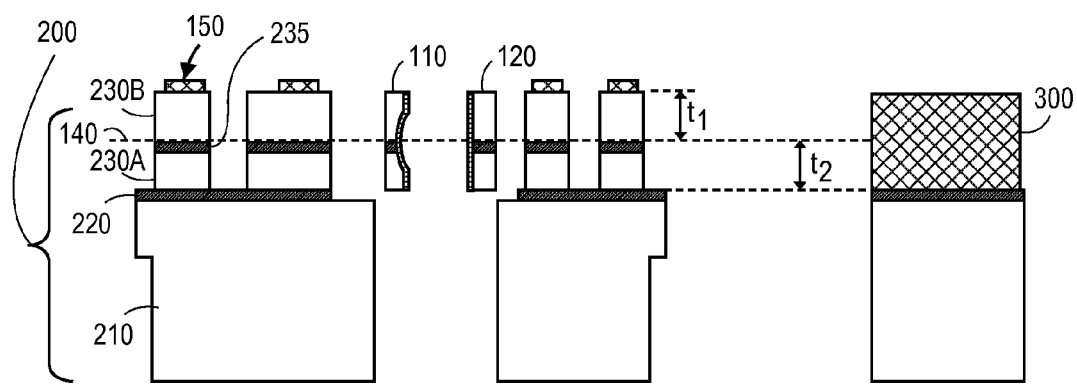
FIG. 11 illustrates another exemplary integrated monolithic optical bench including a three-dimensional curved optical surface fabricated using multiple etch stop layers, in accordance with embodiments of the present invention.

FIG. 11 illustrates another exemplary multi-step etching process that can be used to define the optical axis depth independent from the fabrication tolerance. In FIG. 11, the substrate 200 includes two Buried Oxide (BOX) layers 220 and 235 and two device layers 230A and 230B. The first BOX layer 235 is used as the etch stop layer for the anisotropic etching step used in fabricating the out-of-plane curved surface profile of a three-dimensional curved optical element 110. Thus, the height (thickness $t_1$) of the top device layer 230B is the same as the depth of the optical axis measured from the top surface of the substrate, and the height (thickness $t_2$) of the bottom device layer 230A is the same as or greater than $t_1$. The second BOX layer 220 is used as the sacrificial layer used to release any moving parts. For example, if the three-dimensional curved optical element 110 and/or one or more flat optical elements 120 is moveable, the sacrificial layer 220 can be removed to release those elements 110 and 120.

In one embodiment, etching of the sacrificial layer can be performed from the handle layer 210, if a substrate hole is created under the moving parts. In this embodiment, if more than one three-dimensional curved optical element 110 is fabricated on the substrate 200, each will have substantially the same optical axis independent of the process variation with reactive ion etching. In embodiments in which an optical fiber 300 or other source is integrated on the substrate 200, such that the source optical axis should be aligned with the optical axis of the three-dimensional optical element 110, the thickness ($t_1$ and $t_2$) of the device layers 230A and 230B is selected to ensure alignment. If the BOX layer 220 and 235 thicknesses are small enough, the BOX layer thicknesses can be ignored.

In any of the above embodiments, the three-dimensional curved optical element is etched using a multi-step etching technique. In one embodiment, the multi-step etching technique includes both isotropic and anisotropic etching to create the desired curved surface profile in the out-of-plane direction (direction normal to the substrate surface), while the two-dimensional mask layout and lithography controls the cross-section in the in-plane direction (direction parallel to the substrate surface).

Figure 12:
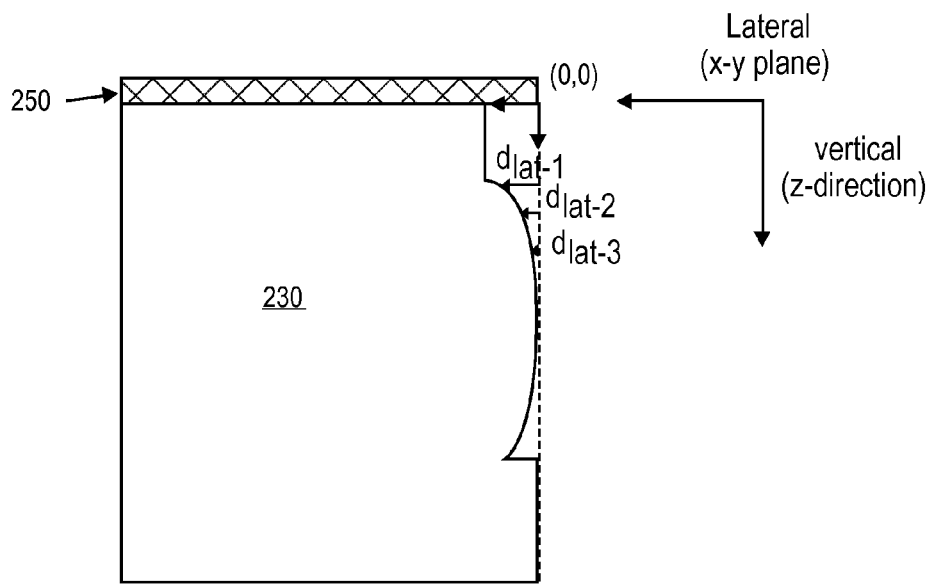
FIG. 12 illustrates exemplary lateral etching depths at different vertical locations for fabricating a three-dimensional curved optical element, in accordance with embodiments of the present invention.

FIG. 12 illustrates an exemplary multi-step etching technique utilizing multiple time-controlled isotropic and anisotropic etching steps to fabricate a three-dimensional curved optical element. As shown in FIG. 12, isotropic etching is used to perform lateral (x-y) etching at a given depth, while anisotropic etching is used to advance the etching depths (z) from one vertical isotropic etching position to another, when needed. Various lateral etching undercut depths (x-y etching amounts) are shown in FIG. 12, and denoted $d_{lat-1}$, $d_{lat-2}$ and $d_{lat-3}$. In one embodiment, passivation (side wall protection) is used to protect the already laterally etched portions from further etching, thereby preventing interaction between the multiple isotropic etching steps.

Figure 13:
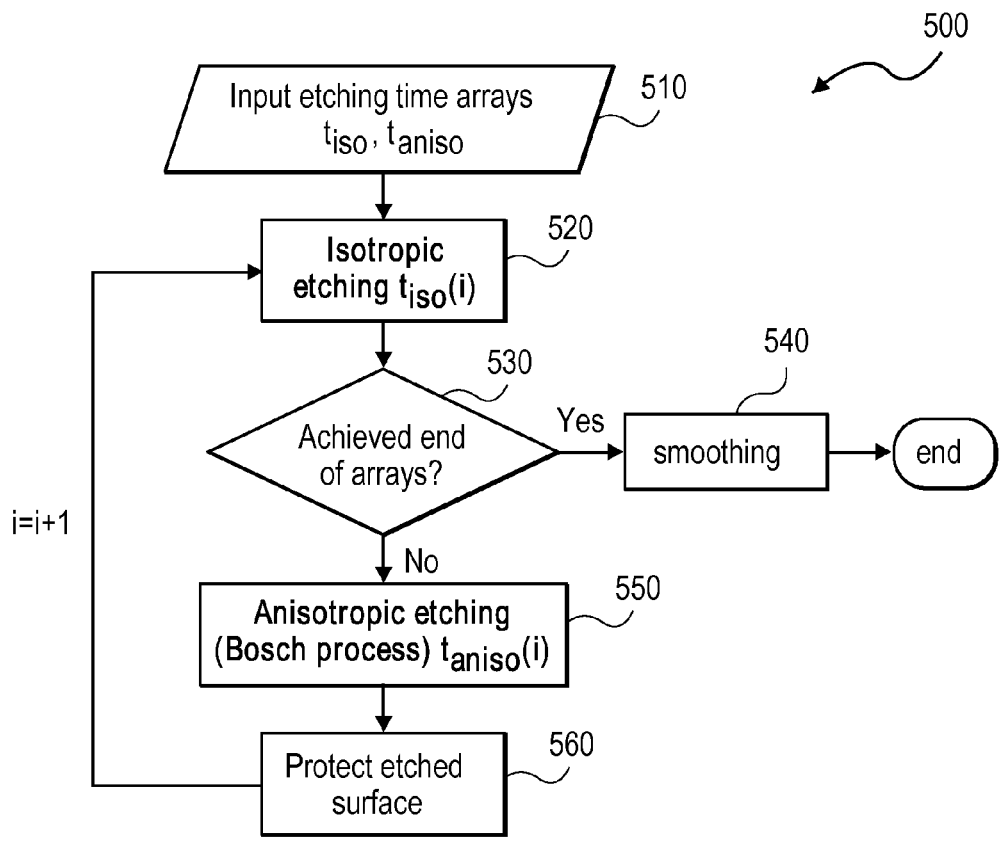
FIG. 13 illustrates an exemplary multi-step etching process for fabricating a three-dimensional curved optical element, in accordance with embodiments of the present invention.

An exemplary process 500 for performing the multi-step isotropic and anisotropic etching is illustrated in FIG. 13. Based on a target curved surface profile of the three-dimensional curved optical element, at 510, etching times are calculated and input to isotropic and anisotropic etch time arrays. For example, the following parameters can be utilized to calculate the etch times: surface profile type (concave, convex, etc.), radius of curvature R, diameter (height of the curved part) Ø, isotropic etch rate $r_{iso}$, anisotropic etch rate $r_{aniso}$, and minimum etching pitch p. The etch rates $r_{iso}$ and $r_{aniso}$ may be determined from technology calibration. In addition, the etch rates may be aspect-ratio dependent, if the mask opening size is not large enough. In this case, the etch rates are input arrays, in which the independent variable is the depth. The minimum etch pitch p determines whether anisotropic etching steps are needed during the etching. In some cases, e.g., for convex shapes around the vertex, the lateral etching is almost zero and if no anisotropic etching is applied, then a large number of small isotropic etching steps may be needed.

As used below, the lateral etch depth (undercut) is denoted by $d_{lat}$, the vertical etch depth is denoted by $d_{ver}$ and the total depth being denoted by h. The equation used to calculate the lateral etching depth depends on the profile type. For convex surfaces, the lateral etching depth is given by:

$$d_{lat} = R - \sqrt{R^2 - \left[\frac{\phi}{2} - h(i)\right]^2}, \quad \text{(Equation 1)}$$

while for concave surfaces, the lateral etching depth is given by:

$$d_{lat} = \sqrt{R^2 - \left[\frac{\phi}{2} - h(i)\right]^2} - \sqrt{R^2 - \left(\frac{\phi}{2}\right)^2} \quad \text{(Equation 2)}$$

Based on the input parameters and the above equations, the etching times can then be calculated as follows:
i=1;
Loop start;
Calculate $d_{lat}$ (i) from profile equation and current h (i);
If $d_{lat}$ (i)>p, then h(i+1)=h(i)+$d_{lat}$ (i);
Else h(i+1)=h(i)+p and $d_{ver}$(i)=p−$d_{lat}$ (i);
If h(i)<Ø, then i=i+1 and go to Loop start;
Else calculate isotropic and anisotropic etching times.
Once the isotropic and anisotropic etching times are calculated, the isotropic and anisotropic etching time arrays can be populated with the following information: isotropic etching time array $t_{iso}=d_{lat}/r_{iso}$ for each calculated isotropic etch time; anisotropic etching time array $t_{aniso}=d_{ver}/r_{aniso}$ for each calculated anisotropic etch time.

At 520, isotropic etching is performed for time $t_{iso}$(i), with i set to 1, according to the isotropic etching time array. At 530, a determination is made whether the end of the etching time arrays has been reached. If so, at 540, smoothing is applied to the curved surface and the process ends. If not, at 550, anisotropic etching is performed for time $t_{aniso}$(i), with i set to 1, according to the anisotropic etching time array. At 560, the etched surface is protected from further isotropic etching and the process repeats at step 520 with i being set to i+1. It should be noted that the starting etching step can be either isotropic or anisotropic, depending on the targeted profile. Moreover, the isotropic etching time or the anisotropic etching time can be set to zero to enable successive etching steps of the same type to be performed.

Figure 14A:
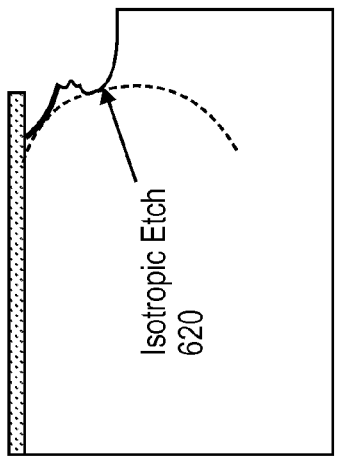
FIGS. 14A-14E illustrate exemplary etching steps for fabricating a three-dimensional curved optical element, in accordance with embodiments of the present invention.
Figure 14C:
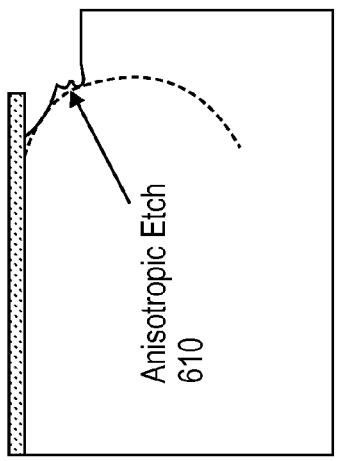
Figure 14E:
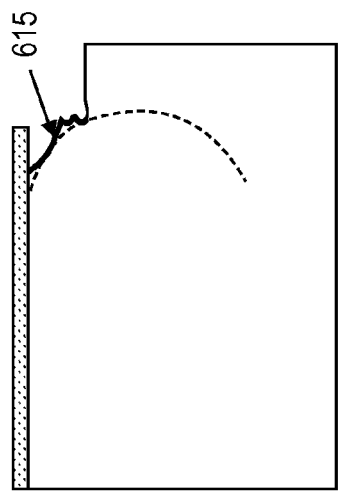
Figure 14B:
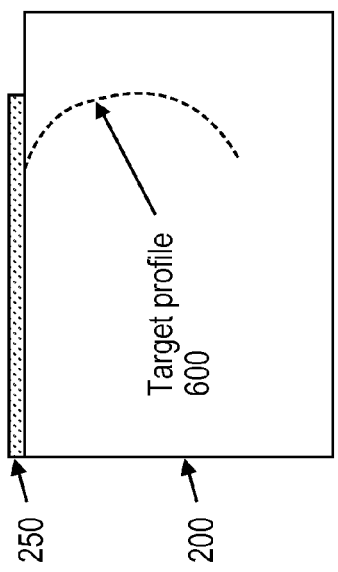
Figure 14D:
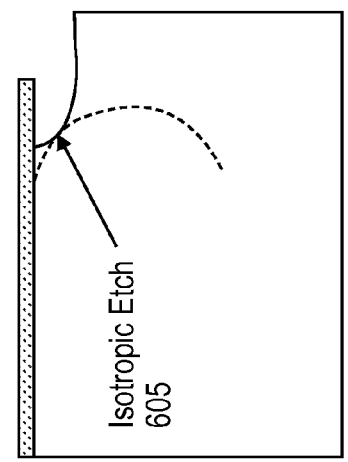

As shown in FIGS. 14A-14E, for a target surface profile 600 of convex shape (shown in FIG. 14A), the first etching step is an isotropic etch 605 (shown in FIG. 14B). Both lateral and vertical etching occurs during isotropic etching, as can be seen in FIG. 14B, and the etching time is adjusted to achieve the needed lateral etching for the target profile 600. The vertical etching that occurs during isotropic etching automatically advances the etching deeper into the substrate 200. However, if the advancement in depth is not enough, an anisotropic etch 610 is performed, as shown in FIG. 14C, to reach the required depth for the next lateral etching step. The etched surface may then be protected from further isotropic etching using any type of protection material 615, as shown in FIG. 14D. It should be understood that the surface protection layer has to be removed from the bottom of the etched surface so as not to block subsequent etching steps. As shown in FIG. 14E, additional isotropic etching 620 may be performed, and further anisotropic and isotropic etching may also be performed to achieve the desired target profile 600.

For silicon substrates, anisotropic etching can be performed using, for example, Focused Ion Beam (FIB), Laser or Laser-assisted etching, RIE, DRIE or wet preferential etching. Isotropic etching can be dry based on, for example, $XeF_2$, optimized RIE or DRIE for isotropic etching conditions, or wet using, for example, HNA, electrochemical etching or wet preferential etching. The passivation layer (protection material 615) can be, for example, photoresist (PR), a polymer, such as $C_4F_8$, grown or deposited $SiO_2$ or SiN or any other material that has good etching selectivity relative to the silicon. For glass or Pyrex substrates, anisotropic etching can be performed, for example, using FIB, Laser or Laser-assisted, RIE, DRIE, as well as sand blasting. Isotropic etching can be performed using, for example, HF. The passivation layer can be, for example, PR, polymer, deposited SiN or any other material that has good etching selectivity relative to the glass.

In an exemplary embodiment, a silicon substrate 200 is used, with $SiO_2$ as the etching mask 250. Etching is performed in an inductively coupled plasma etcher. Anisotropic etching is performed using the Bosch process DRIE with $SF_6$ and $C_4F_8$ gases, while isotropic etching is performed by switching off the substrate bias (RIE source) and letting the ICP source act with $SF_6$ gas only. In this embodiment, the passivation layer 615 is $C_4F_8$ polymer.

Figure 15B:
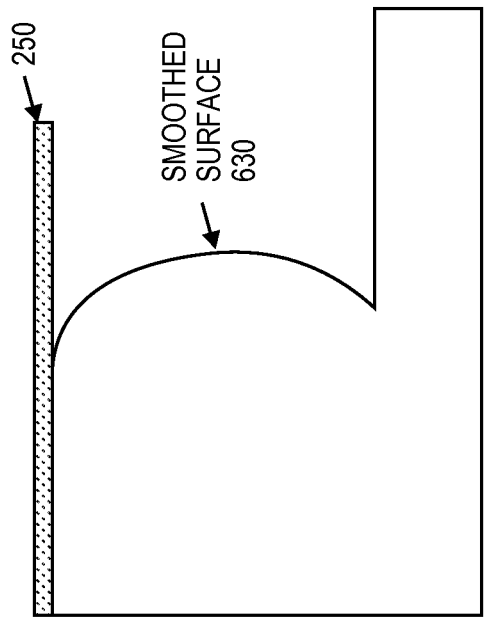
FIGS. 15A and 15B illustrate an exemplary smoothing step for fabricating a three-dimensional curved optical element, in accordance with embodiments of the present invention.
Figure 15A:
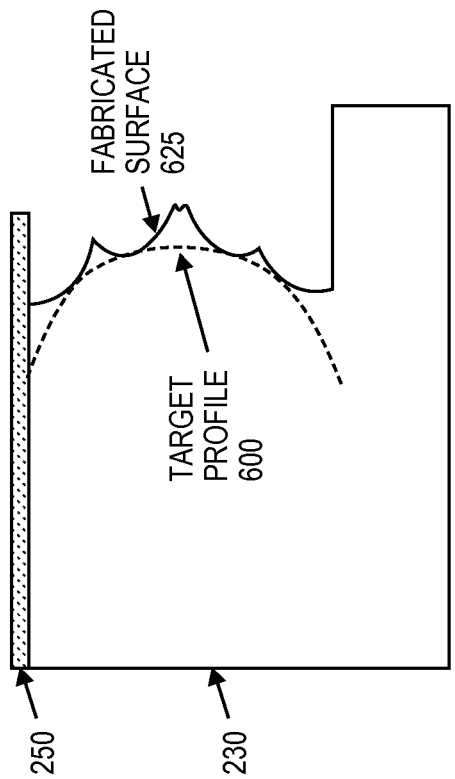

Turning now to FIGS. 15A and 15B, the resulting fabricated surface 625 may be rough, as shown in FIG. 15A. Therefore, a surface smoothing step may be performed, as shown in FIG. 15B, to obtain a smoothed surface 630 with a sufficient quality to substantially correspond to the target profile 600. For example, in exemplary embodiments, the curved surface can be smoothed by dry isotropic $SF_6$ etching and/or HNA wet chemical etching.

Figure 16:
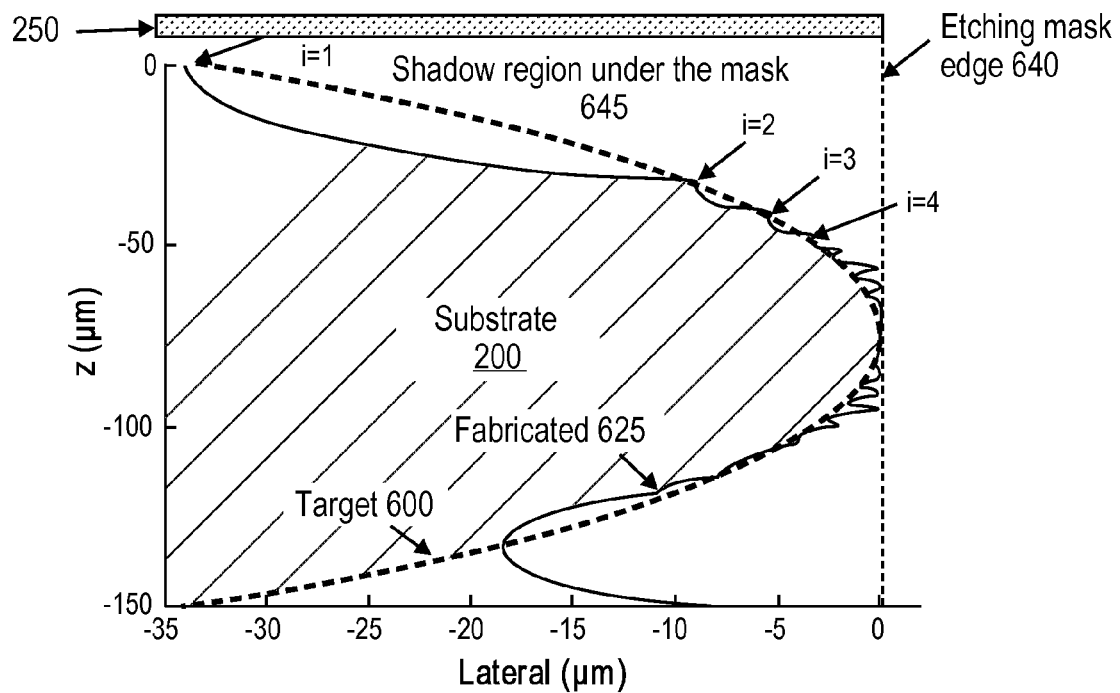
FIG. 16 illustrates an exemplary simulated fabrication of a three-dimensional curved optical element, in accordance with embodiments of the present invention.
Figure 17:
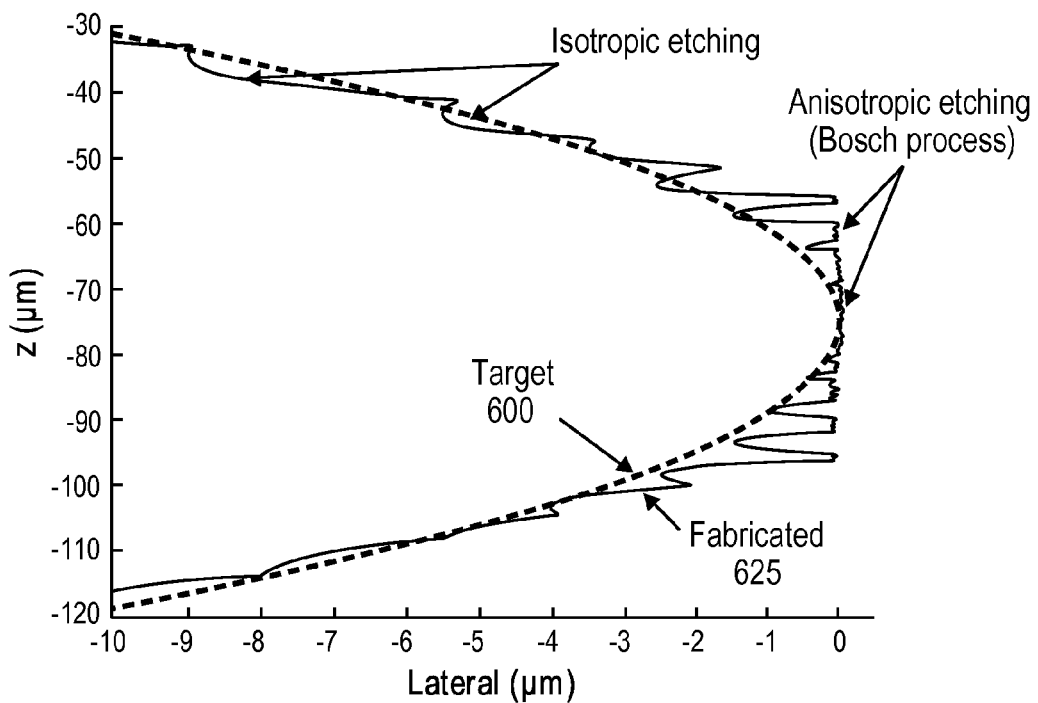
FIG. 17 is a zoom view of the exemplary simulated fabrication of FIG. 16, in accordance with embodiments of the present invention.

FIG. 16 provides a numerical example of a fabricated surface 625 and target profile 600, with zoom around the vertex shown in FIG. 17. In the example of FIGS. 16 and 17, the target profile 600 is a convex shape with radius of curvature of R=100 µm and diameter (height) of Ø=150 µm. The edge 640 of the etching mask 250 is shown as corresponding to lateral position 0, while the bottom of the etching mask 250 adjacent the substrate 200 corresponds to vertical position 0. In addition, several initial isotropic etching steps are denoted in FIG. 16 as i=1, i=2, i=3 and i=4, which collectively form a shadow region 645 under the etching mask 250. The resolution and accuracy of the fabricated surface 625 are dependent upon the practical controlled minimum etching depth and its accuracy. Etching conditions can be optimized to control the ratio of the lateral to vertical etching during the isotropic etching step, which will also affect the resulted profile.

Figure 18A:
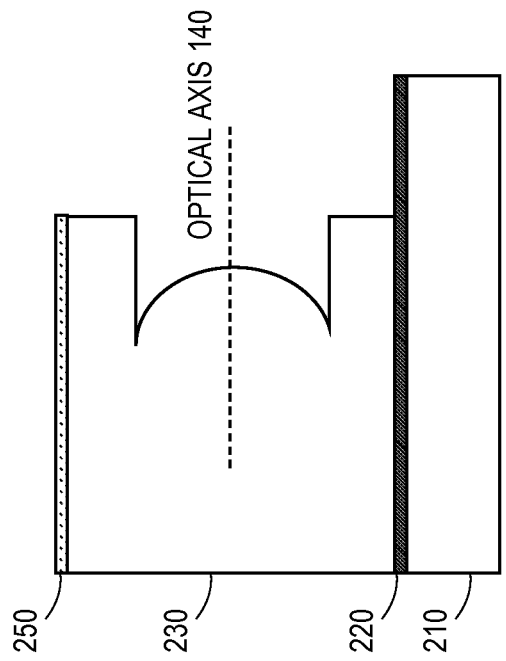
FIGS. 18A and 18B illustrate exemplary anisotropic etching steps for fabricating a three-dimensional optical element, in accordance with embodiments of the present invention.
Figure 18B:
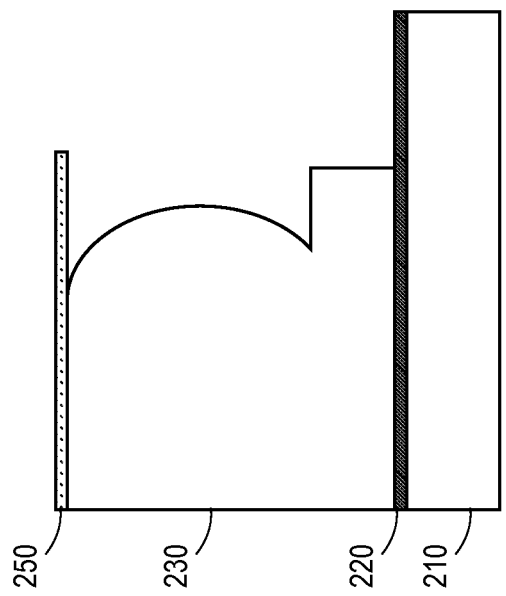
Figure 19A:
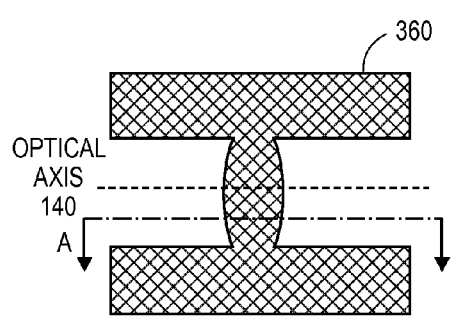
FIGS. 19A and 19B illustrate exemplary lithography and etching steps for fabricating a three-dimensional curved optical element, in accordance with embodiments of the present invention.
Figure 20A:
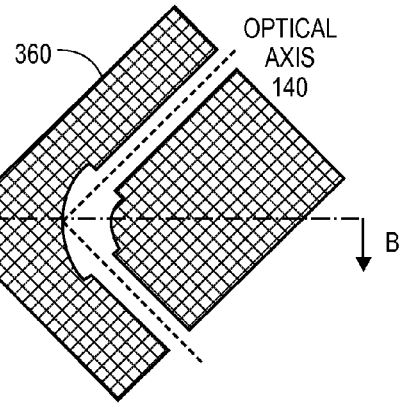
FIGS. 20A and 20B illustrate other exemplary lithography and etching steps for fabricating a three-dimensional curved optical element, in accordance with embodiments of the present invention.
Figure 19B:
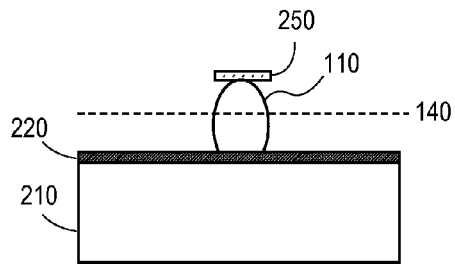
Figure 20B:
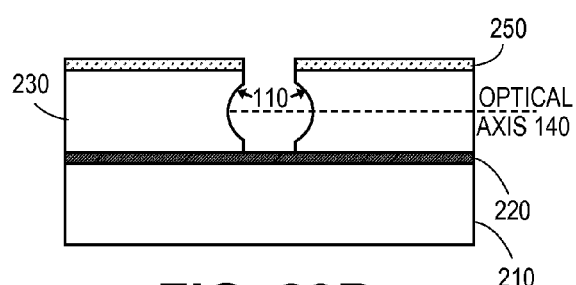

As can be seen in FIGS. 18A and 18B, pre or post etching can also be performed before or after the curved surface formation. For example, as shown in FIG. 18A, anisotropic etching can be performed after curved surface creation in order to reach an etch stop layer 220. In another example, as shown in FIG. 18B, an anisotropic etch step may be performed before curved surface creation in order to adjust the height of the optical axis 140.

Turning now to FIGS. 19A and 19B and 20A and 20B, by combining a curved drawing on a mask layout 360 and a lithography technique for patterning, the curved drawing is transferred to the etching mask 250 on the top of the substrate (e.g., on the surface of the device layer 230). The curved drawing includes one or more areas corresponding to openings in the etching mask 250 after patterning. After utilizing the above-described multi-step etching process to profile the curved surface in the z-direction through the openings in the etching mask 250, a three-dimensional curved surface 110 with a desired optical axis 140 is created.

Figure 21A:
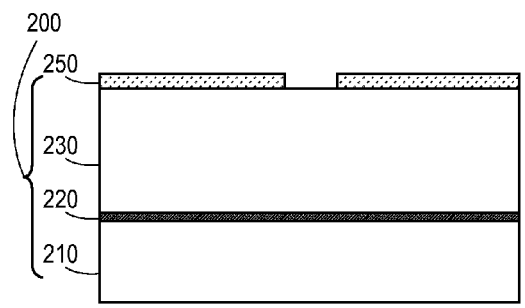
FIGS. 21A-21D illustrate exemplary isotropic etching steps for fabricating a three-dimensional curved optical element, in accordance with embodiments of the present invention.
Figure 21C:
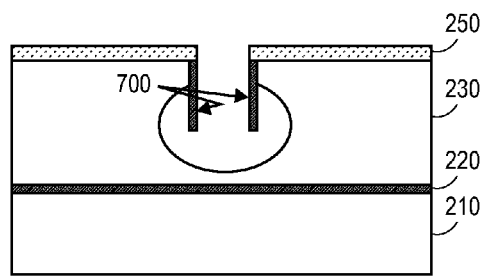
Figure 21B:
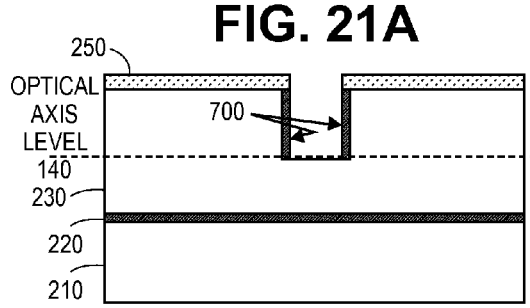
Figure 21D:
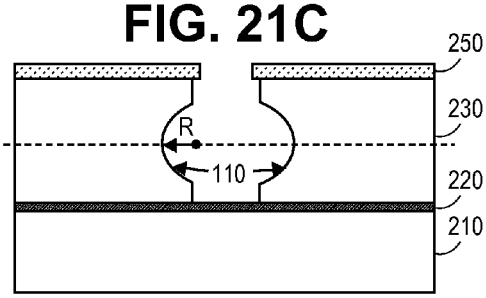
Figure 22A:
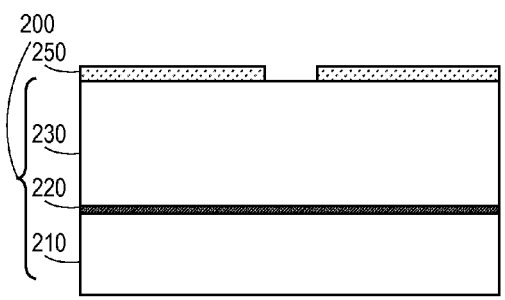
FIGS. 22A-22D illustrate other exemplary isotropic etching steps for fabricating a three-dimensional curved optical element, in accordance with embodiments of the present invention.
Figure 22C:
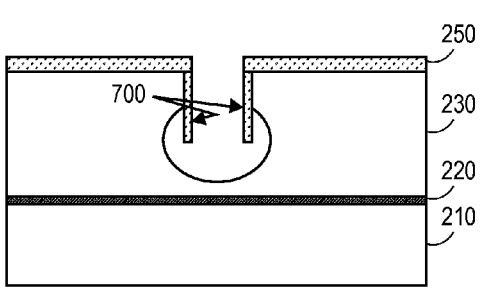
Figure 22B:
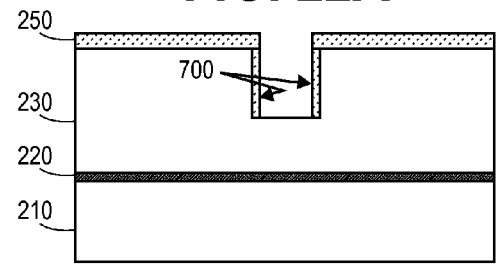
Figure 22D:
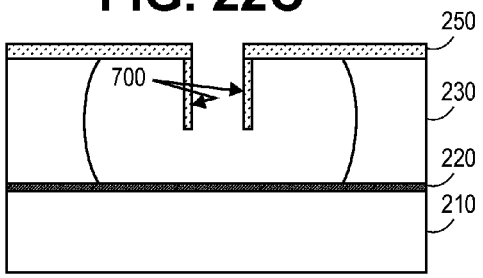

With reference now to FIGS. 21A-21D, in another multi-step etching embodiment, one main long-time isotropic etching step can be used to produce concave surfaces with a corresponding radius of curvature, as shown in FIGS. 21C and 21D. The long-time isotropic step may be preceded by an etching step, as shown in FIGS. 21A and 21B, which can be either anisotropic or isotropic to set the optical axis depth 140. In addition, a protection layer 700 may be applied to the etched surface with protection removal from the bottom of the trench. A post-anisotropic etch may also be performed to separate the concave cavity 110 into parts that can be further released and moved by a MEMS actuator, as shown in FIG. 21D. The etching conditions of the isotropic etching step in FIG. 21C determine the profile and radius of curvature of the generated optical surface. The optical axis level measured from the substrate 200 top surface (e.g., top of the device layer 230) is determined by:

$$h_{optical-axis} = r_{step1} \times t_{step1}, \quad \text{(Equation 3)}$$

where $r_{step1}$ is the etch rate of the first etching step (anisotropic, isotropic or mixed) and $t_{step1}$ is the time duration of the first etching step. The radius of curvature in the in-plane $R_{xy}$ is determined from the drawn layout, while the radius of curvature in the out-of-plane direction $R_z$ is time controlled and determined from the etch rate and time duration of the isotropic etching step such that:

$$R_z = r_{step2} \times t_{step2}. \quad \text{(Equation 4)}$$

Due to the use of a substrate with an etch stop layer 220, the radius of curvature in the out-of-plane direction $R_z$ is not limited by the substrate thickness, which may be, for example, a few hundreds of microns.

FIGS. 22A-22D illustrate an embodiment in which a concave profile resulting from a long isotropic etching step produces a radius of curvature on the order of 1 millimeter. In this embodiment, the sidewall protection material 700 has to be mechanically stable and attached to the etching mask 250 at the opening. For example, thermally grown $SiO_2$ can be used as both the etching mask 250 and the protection material 700 with a Si substrate 200 when the isotropic etching is performed using a dry etching technique.

FIGS. 23A and 23B and FIGS. 24A and 24B illustrate various embodiments in which the isotropic etching conditions can be optimized to control the resulting concave shape. The optimization can be done, for example, by adding an anisotropic component during the isotropic etching. In FIGS. 23A and 24A, the mask layouts 360 are identical. However, the resulting concave shapes in FIGS. 23B and 24B differ. In FIG. 23B, the etching conditions are selected to create a circular cross-section of the three-dimensional curved optical element 110, while in FIG. 24B, the etching conditions are selected to achieve a parabolic cross-section of the three-dimensional curved optical element 110.

FIGS. 25A and 25B illustrate embodiments in which different opening sizes in the mask layout 360 ($d_1$, $d_2$, $d_3$) results in different three-dimensional curved optical elements (110A, 110B, 110C), each having a different concave shape radius of curvature ($R_1$, $R_2$, $R_3$), while the optical axis 140 is maintained at the same depth determined by the anisotropic etching. In these embodiments, the etching conditions can be adjusted to maximize the lag effect during the isotropic etching and to minimize the lag effect during the anisotropic etching. The lag effect, together with various drawn shapes on the mask layout 360, can in general be used to produce complex three-dimensional shapes embedded within the substrate (i.e., device layer 230).

With reference now to FIGS. 26A-26E, in another multi-step etching embodiment, a continuous anisotropic etching process can be used with continuous control of the etching slope. In this embodiment, the etching conditions are continuously changed for the purpose of building the required curved surface profile along the z-direction (out-of plane), while the layout drawing controls the cross sectional profile in the x-y plane.

Figure 26A:
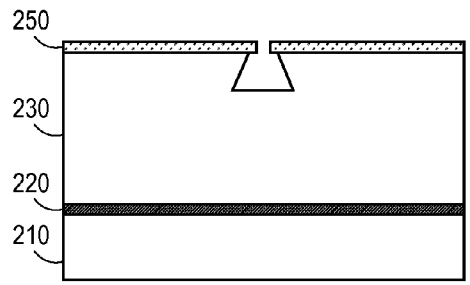
FIGS. 26A-26E illustrate exemplary Bosch process etching steps for fabricating a three-dimensional curved optical element, in accordance with embodiments of the present invention.
Figure 26B:
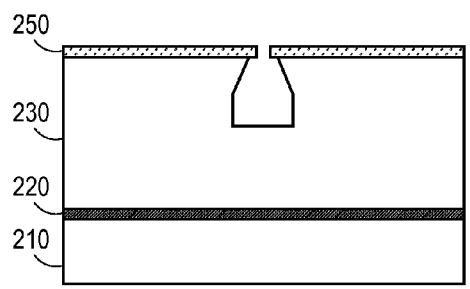
Figure 26C:
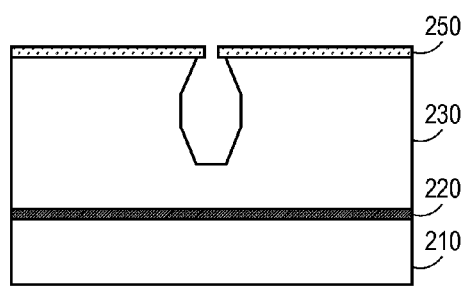
Figure 26D:
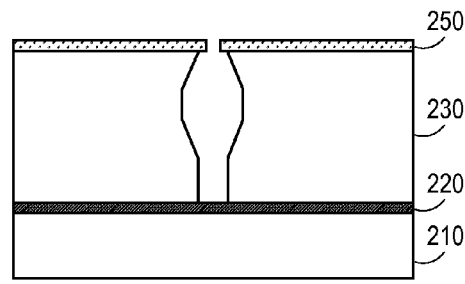
Figure 26E:
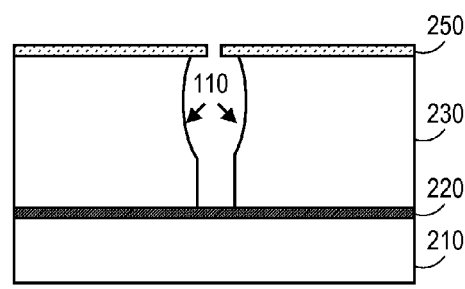

In an exemplary embodiment, anisotropic etching of a Si substrate is performed using a Bosch process, in which the etching parameters are effective in changing the etching profile slope when the mask opening is small, for example, less than 100 µm, and preferably less than 50 µm. In this embodiment, vertical, positive or negative profiles can be obtained, depending on the etching conditions. The combination of these profiles can result in more general profiles, as shown in FIGS. 26A-26C. For example, a concave shape may be produced by first performing anisotropic etching with outward tapering, as shown in FIG. 26A, followed by vertical anisotropic etching, as shown in FIG. 26B, and then anisotropic etching with inward tapering, as shown in FIG. 26C. Although only three tuning steps are shown for simplicity, it should be understood that a larger number of tuning steps may be needed to produce the target profile with an acceptable accuracy. FIGS. 26D and 26E illustrate continuous anisotropic etching to the etch stop layer 220 and smoothing of the etched surfaces to produce the resulting three-dimensional curved optical element 110.

Figure 27A:
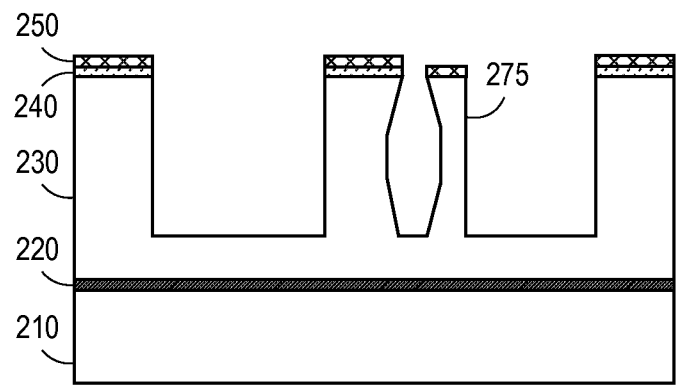
FIGS. 27A and 27B illustrate exemplary Bosch process etching steps for fabricating both a three-dimensional curved optical element and one or more flat elements, in accordance with embodiments of the present invention.
Figure 27B:
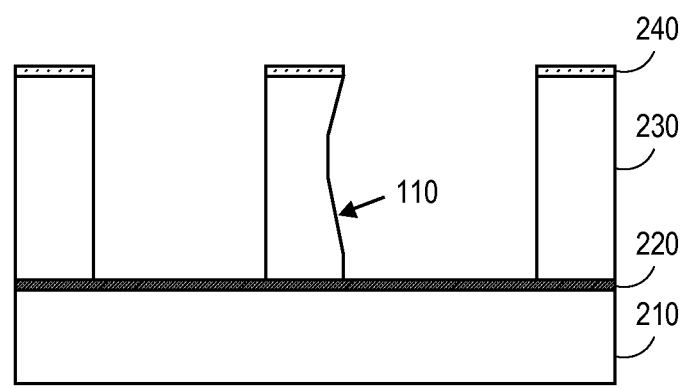

When the mask opening is not small, tuning the etching parameters will not change the etching tapering. Thus, as shown in FIGS. 27A and 27B, by having both small and large openings on the same etching mask 250, both curved and flat surfaces can be created. In FIG. 27A, a dummy wall 275 is used to enable the small opening to control the etching slope at the locations of the desired curved profile. The dummy wall 275 can then be removed, as shown in FIG. 27B, to reveal the three-dimensional curved optical element 110. For example, in an exemplary embodiment, the dummy wall 275 can be removed by using two etching masks and anisotropically removing the dummy wall. In another exemplary embodiment, the removal can be done by wet or dry isotropic etching. In yet another exemplary embodiment, the dummy wall 275 can be removed at the same time as releasing any moving parts of the optical bench system. In still another exemplary embodiment, oxidation and oxide etching may be used to remove the dummy wall 275.

Figure 28:
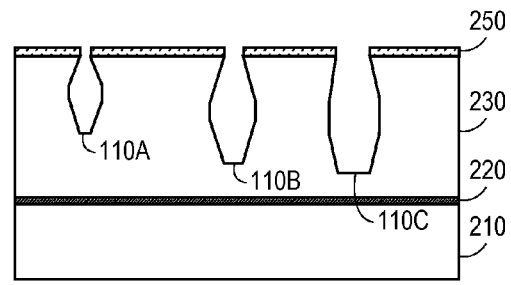
FIG. 28 illustrates exemplary radii of curvatures of three-dimensional curved optical elements fabricated using a Bosch etching process, in accordance with embodiments of the present invention.

As can be seen in FIG. 28, having openings of different sizes, together with the technique shown in FIGS. 26A-26E, can produce three-dimensional curved optical elements 110A, 110B and 110C that have similar profile shapes, but different profile radii of curvature.

Figure 29:
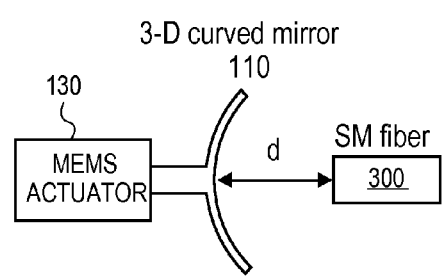
FIG. 29 illustrates an exemplary three-dimensional curved optical element optically coupled to an optical fiber source, in accordance with embodiments of the present invention.
Figure 30:
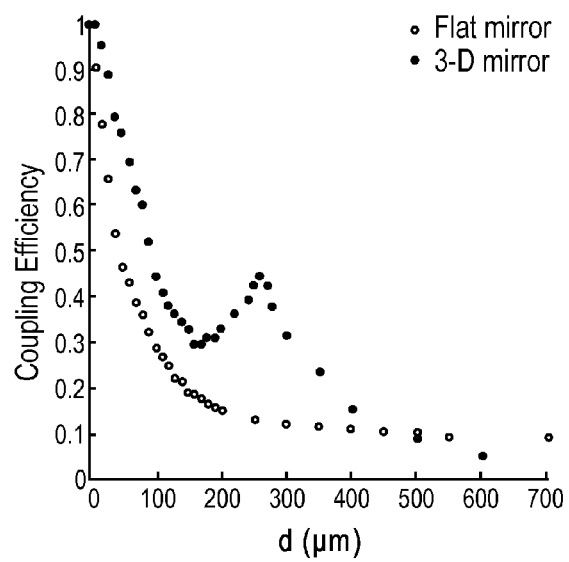
FIG. 30 illustrates exemplary measured coupling efficiencies between the optical fiber source and the three-dimensional curved optical element of FIG. 29, in accordance with embodiments of the present invention.

With reference now to FIGS. 29 and 30, the coupling efficiency between a laser source 300 and MEMS mirror (e.g., a mirror 110 coupled to a MEMS actuator 130) is important for many applications, such as tunable laser sources and Fabry Perot filters. The coupling efficiency between a fabricated concave aspherical three-dimensional mirror 110 and an SM optical fiber 300 at 1.55 µm wavelength was measured and compared to a conventional flat mirror. The power coupled back into the optical fiber 300 was measured via a directional coupler. The result is shown in FIG. 30. As can be seen, the flat mirror coupling efficiency at a separation of 260 µm is below 15%, while that of the three-dimensional curved mirror 110 was about 45%. The three-dimensional mirror radii of curvatures in the in-plane and out-plane directions were 350 µm and 250 µm, respectively. Higher coupling efficiency can be obtained by optimizing the fabrication of the three-dimensional mirror to have a matched radii of curvature.

Figure 31:
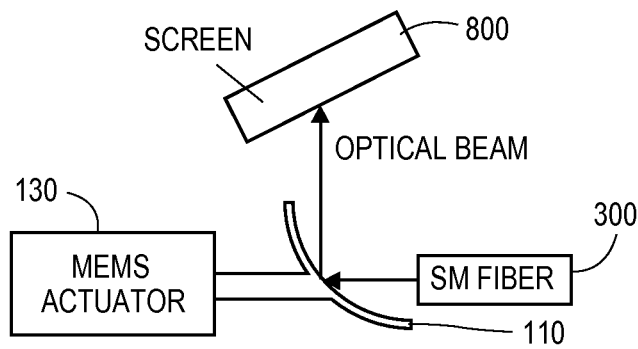
FIG. 31 illustrates another exemplary three-dimensional curved optical element optically coupled to an optical fiber source, in accordance with embodiments of the present invention.
Figure 32:
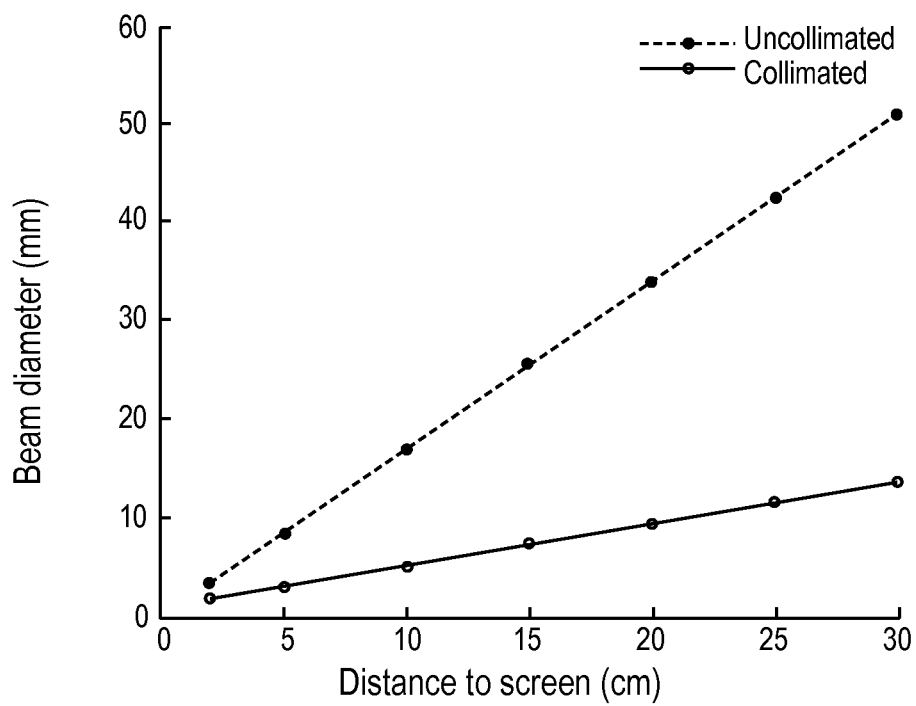
FIG. 32 illustrates exemplary measured beam diameters based on the distance between the optical fiber source and the three-dimensional curved optical element of FIG. 31, in accordance with embodiments of the present invention.

With reference now to FIGS. 31 and 32, collimation of an SM fiber output used with a MEMS optical system is usually performed by creating a lens on the fiber tip, thus producing a lensed fiber. In accordance with embodiments of the present invention, by using a three-dimensional curved optical element 110 coupled to a MEMS actuator 130, as shown in FIG. 31, the collimation of the SM fiber 300 output can be performed by the monolithic optical bench system itself using either a refractive or reflective configuration.

For example, the output from a SM fiber 300 operating at 675 nm wavelength was collimated using a fabricated three-dimensional mirror 110. For output beams with circular cross section, the incidence angle on the mirror 110 was adjusted to be 50°, as shown in FIG. 31, and the fabricated mirror had a radii of curvature in the in-plane and out-of-plane directions of 325 µm and 135 µm, respectively, such that:

$$R_{in\text{-}plane} \times \cos(\theta_{inc}) \approx R_{out\text{-}of\text{-}plane} / \cos(\theta_{inc}) \qquad \text{(Equation 5)}$$

The output beam from the three-dimensional mirror 110 was projected on a screen 800 at a known distance from the mirror 110. The distance was varied and the beam spot diameter on the screen was recorded. A comparison between the measured output from a flat mirror (uncollimated) and the output from the three-dimensional aspherical mirror 110 (collimated) is given in FIG. 32. As can be seen, the output from the three-dimensional mirror 110 has a divergence angle that is approximately 4 times smaller than the output from the flat mirror.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. An optical system, comprising:
    a substrate; and
    a three-dimensional curved optical element etched in the substrate and optically coupled to receive a first optical beam and operable to produce a second optical beam;
    wherein an optical axis of the first optical beam, a central axis of the three-dimensional curved optical element and an optical axis of the second optical beam lay within a height of the substrate and are parallel to the plane of the substrate.

2. The optical system of claim 1, further comprising:
    a moveable optical element etched in the substrate; and
    a Micro-Electro-Mechanical Systems (MEMS) actuator coupled to the moveable optical element.

3. The optical system of claim 2, wherein the three-dimensional curved optical element is the moveable optical element.

4. The optical system of claim 3, wherein the MEMS actuator is coupled to the three-dimensional curved optical element such that the three-dimensional curved optical element can be configured to move in-plane with respect to the substrate to tune a distance traveled by an optical beam propagating parallel to the plane of the substrate or out-of-plane with respect to the substrate to tune a position of the central axis.

5. The optical system of claim 2, wherein the MEMS actuator is an electrostatic comb drive actuator.

6. The optical system of claim 2, further comprising:
    a flat element etched in the substrate, the flat element having a flat surface perpendicular to the plane of the substrate.

7. The optical system of claim 6, wherein the flat element is an optical element, an electrical element or a mechanical element.

8. The optical system of claim 6, wherein at least one of the flat element and the three-dimensional curved optical element is the moveable optical element.

9. The optical system of claim 1, wherein the three-dimensional curved optical element is a spherical mirror or one of a spherical or elliptical lens.

10. The optical system of claim 1, wherein the three-dimensional curved optical element has a concave or convex profile.

11. The optical system of claim 1, wherein the substrate includes a handle layer, a device layer and a sacrificial layer between the handle layer and the device layer.

12. The optical system of claim 11, wherein:
    the three-dimensional curved optical element is fabricated using multiple time-controlled etching steps in one of the device layer and the handle layer, the multiple time-controlled etching steps including at least one anisotropic etching step, at least one surface-protection step and at least one isotropic etching step; and
    respective etching depths of each of the multiple time-controlled etching steps are related to a target curved profile of the three-dimensional curved optical element.

13. The optical system of claim 12, wherein the three-dimensional curved optical element is fabricated by adding an anisotropic etching component during the isotropic etching step.

14. The optical system of claim 12, wherein a radius of curvature of the three-dimensional curved optical element is based at least in part on a size of a mask opening and etching parameters.

15. The optical system of claim 11, wherein:
the three-dimensional curved optical element is fabricated using multiple time-controlled etching steps in one of the device layer and the handle layer, the multiple time-controlled etching steps including at least two isotropic etching steps and at least one surface-protection step; and
respective etching depths of each of the multiple time-controlled etching steps are related to a target curved profile of the three-dimensional curved optical element.

16. The optical system of claim 11, further comprising:
a flat element etched in the substrate, the flat element having a flat surface perpendicular to the plane of the substrate, and wherein the three-dimensional curved optical element is fabricated using a first etching mask and the flat element is fabricated using a second etching mask, the three-dimensional curved optical element being protected in a shadow region under the second etching mask during fabrication of the flat element.

17. The optical system of claim 16, wherein the sacrificial layer is an etch stop layer that enables fabrication of the flat element by anisotropic etching using the second etching mask after fabrication of the three-dimensional curved optical element.

18. The optical system of claim 16, wherein the fabrication of the three-dimensional curved optical element produces a dummy wall that is removed during fabrication of the flat element using the second etching mask.

19. The optical system of claim 16, wherein the three-dimensional curved optical element is fabricated in the handle layer and the flat element is fabricated in the device layer.

20. The optical system of claim 11, wherein the three-dimensional curved optical element is fabricated by post-processing an etched curved surface of the three-dimensional optical element.

21. The optical system of claim 20, wherein the post-processing includes at least one of a single-layer coating, a multi-layer coating, surface smoothing and oxidation.

22. The optical system of claim 11, further comprising:
a groove etched in the substrate for receiving an optical source aligned with the central axis of the three-dimensional curved optical element.

23. The optical system of claim 22, wherein the groove is fabricated by etching both the handle layer and the device layer.

24. The optical system of claim 22, wherein the groove is a three-dimensional fiber groove fabricated during fabrication of the three-dimensional curved optical element.

25. The optical system of claim 22, wherein the optical source is an optical fiber.

26. The optical system of claim 22, wherein the three-dimensional curved optical element and the optical source collectively function as a lensed fiber.

27. The optical system of claim 22, wherein the three-dimensional curved optical element is a refractive optical element and further comprising:
a capping layer sealing the optical bench system such that the optical bench system is isolated from an outside environment and from the groove for receiving the optical source.

28. The optical system of claim 11, wherein a concave surface of the three-dimensional curved optical element is fabricated by continuously changing etching parameters during an anisotropic etching step that etches through a mask opening less than 100 micrometers in one of the device layer and the handle layer.

29. The optical system of claim 28, wherein a radius of curvature of the three-dimensional curved optical element is based on a size of the mask opening and the etching parameters.

30. The optical system of claim 28, wherein a flat surface is fabricated during the anisotropic etching step through an additional mask opening that is larger in size than the mask opening for the concave surface.

31. The optical system of claim 11, wherein the device layer includes a first device layer and a second device layer and the sacrificial layer includes a first sacrificial layer and a second sacrificial layer, the first sacrificial layer separating the first device layer and the second device layer, the second sacrificial layer being formed adjacent the second device layer, and wherein the three-dimensional curved optical element is fabricated using anisotropic etching of the first device layer and isotropic etching of the first device layer and the second device layer, and wherein the central axis is defined by the first sacrificial layer.

32. The optical system of claim 1, wherein the optical system is an integrated monolithic optical bench system.

33. A method for fabricating a monolithic optical bench, comprising:
providing a substrate; and
etching a three-dimensional curved optical element in the substrate such that an optical axis of a first optical beam received by the three-dimensional curved optical element, a central axis of the three-dimensional curved optical element and an optical axis of a second optical beam produced by the three-dimensional optical element lay within a height of the substrate and are parallel to the plane of the substrate.

34. The method of claim 33, wherein the etching the three-dimensional curved optical element further includes:
combining an in-plane curvature produced from a drawn mask and a lithography technique together with an out-of-plane curvature produced from a multi-step etching technique.

* * * * *